(12) United States Patent
Greaves et al.

(10) Patent No.: US 8,571,946 B2
(45) Date of Patent: *Oct. 29, 2013

(54) CREATION OF EXPORT FILE TO FACILITATE CREATING AND UPDATING OF AFFILIATE WEBSITE

(71) Applicants: David Greaves, Horsham (GB); Thomas Creaven, London (GB)

(72) Inventors: David Greaves, Horsham (GB); Thomas Creaven, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/755,097

(22) Filed: Jan. 31, 2013

(65) Prior Publication Data
US 2013/0166412 A1 Jun. 27, 2013

Related U.S. Application Data

(63) Continuation of application No. 13/455,324, filed on Apr. 25, 2012, which is a continuation of application No. 12/586,797, filed on Sep. 28, 2009, now Pat. No. 8,190,491, which is a continuation of application No. 10/867,909, filed on Jun. 15, 2004, now Pat. No. 7,606,740.

(51) Int. Cl.
*G06Q 30/00* (2012.01)

(52) U.S. Cl.
USPC .................. 705/26.5; 705/26.1; 705/27.1

(58) Field of Classification Search
USPC ........................................ 705/26, 27
See application file for complete search history.

(56) References Cited

U.S. PATENT DOCUMENTS

| | | | |
|---|---|---|---|
| 5,948,061 A | 9/1999 | Merriman et al. | 709/219 |
| 6,006,332 A | 12/1999 | Rabne et al. | 726/6 |
| 6,067,622 A | 5/2000 | Moore | 726/31 |
| 6,363,356 B1 | 3/2002 | Horstmann | 705/26 |
| 6,477,509 B1 | 11/2002 | Hammons et al. | 705/27 |
| 6,629,135 B1 | 9/2003 | Ross, Jr. et al. | 709/218 |
| 6,978,273 B1 | 12/2005 | Bonneau et al. | 707/102 |
| 7,032,168 B1 | 4/2006 | Gerace et al. | 715/205 |
| 7,155,490 B1 | 12/2006 | Malmer et al. | 709/217 |
| 7,162,504 B2 | 1/2007 | McCavley et al. | 707/203 |
| 7,478,089 B2 | 1/2009 | Henkin et al. | 707/5 |
| 7,599,856 B2 | 10/2009 | Agrawal et al. | 705/51 |
| 2001/0037205 A1 | 11/2001 | Joao | 705/1 |
| 2002/0107761 A1 | 8/2002 | Kark et al. | 705/27 |
| 2003/0200144 A1 | 10/2003 | Antonucci et al. | 705/14 |
| 2003/0225778 A1 | 12/2003 | Fisher et al. | 707/102 |
| 2005/0246627 A1 | 11/2005 | Sayed | 715/513 |
| 2009/0307081 A1 | 12/2009 | Rabbitt et al. | 705/14.42 |

OTHER PUBLICATIONS

Karpinski, Richard; "Amazon Releases Web Services APO to E-Commerce Site," InternetWeek Jul. 17, 2002; Proquest #138677551, 2 pgs.

Wilson; "A do-com success: eBay apparel volume heads for $1B mark," WMD Jul. 2, 2002, Proquest #1094750071, 6pgs.

*Primary Examiner* — Rob Pond
(74) *Attorney, Agent, or Firm* — Adams & Wilks

(57) ABSTRACT

The present disclosure is directed to techniques for creating an export file comprised of product codes retrieved from a Vendor Website. A search of the Vendor Website is conducted based on a keyword list created by a registered affiliate and product codes are acquired including graphic data and descriptive text for products obtained in the search. A unique identification code is inserted into the product codes, which are stored in a products database and displayed along with manually activatable editing buttons which allow the registered affiliate to edit the products database. The edited products database forms the export file to be used in creating and/or updating an affiliate website.

57 Claims, 42 Drawing Sheets

Web page features

Select the number of columns to include in your web page(s), for example if 3 is selected this could be used when your content needs to be displayed in the Middle of the page and the left and right columns contain products.
Select or de-select to include a Search Box or a Drop Down List then click "Next >"

Select the number of columns required for your web page

No of columns:   ○ 1   ○ 2   ⊙ 3

Options
☑ Include Search Box
☑ Include Drop Down List

< Back        Next >

Website Wizard V.1.11

FIG.20

Amazon.com Products

If you have the Amazon.com Version the options below will be appropriate if not click on "Next >" to skip this section.
Select the options below to include Amazon products if your web page(s) then select how many products appear in each column of the finished web page. After select the currency settings.

Amazon.com
☐ Include Amazon.com Products

Number Of Products To Display

| Left Column | Centre | Right Column |
|---|---|---|
| 5 ▷ | 0 ▷ | 5 ▷ |
| Total Products 10 | Max Products 10 | |

Vendor's Currency/Display Currency/Currency Conversion
Currency In: $   Display Currency: $   Conversion: 1

Website Wizard V.1.11

⑦

< Back       Next >

FIG.21

Website Wizard V.1.11

Link to your Products Database

Type in the information needed to link to the uploaded Products database, this is where you have uploaded the Products Generator products SQL data files.

Tip: If you don't know these details ask your hosting company or webmaster. After click on "Generate >" (If website template – use upload feature to upload to your website ready to use), to Finish Database Details Host (if not localhost): localhost Database Name: My Database Name Username: My Database User Name Password: My Database Password < Back   Generate >

FIG.22

Website Wizard V.1.11

Select Affiliates & Currencies

Select all affiliates whose products you wish you display and enter currency information in the boxes.
Tip: Tick all for maximum choice — you can always use the control panel to edit later.
When selecting an affiliate, select currency at which it is retrieved from the Vendors, enter the display currency which will be displayed on your website and finally enter the exchange rate.

Select Affiliates
- ☐ Amazon.com
- ☑ AllPosters.com
- ☐ Emerchandise.com
- ☐ Art.com AllPosters.com Currency
- Currency In: $
- Display Currency: $
- Conversion: 1

< Back    Next >

FIG.25

Website Wizard V.1.11

Link to your Products Database

Type in the information needed to link to the uploaded Products database, this is where you have uploaded the Products Generator products SQL data files.
Tip: If you don't know these details ask your hosting company or webmaster, After click on "Generate >" (If website template – use upload feature to upload to your website ready to use), to Finish Database Details
- Host (if not localhost): localhost
- Database Name: My Database Name
- Username: My Database User Name
- Password: My Database Password < Back          Generate >

FIG.27

Website Wizard V.1.11

Website Database Wizard has generated the HTML/PHP code

Option 1: Copy the HTML/PHP code and paste into your web page below the <body> tag
Option 2: Save the code as a PHP file to upload to the server
Option 2.1: If you have saved the code as a PHP file you can upload the file separately and use the line of code below the <body> tag to access it.

Option 1: Copy the HTML/PHP code and paste into your web page below the <body> tag

```
<?php function displayallpostersproducts($linkofproduct,$imagelinkofproduct, $category,$des if (($linkofproduct<>'') and ($linkofproduct<>"Disabled"))
    {
        print "<CENTER><FONT SIZE='2'><BR>";
        print "<A HREF=\"$linkofproduct\" target='blank'><img src=
        print "<BR></FONT><FONT SIZE='1' color='000000'>";
        if ($descriptionofproduct<>'''') { print "$descriptionofproduct<
        if ($productsize<>'''') { print "$productsize<BR>"; }
```

Option 2: Save the code as a PHP file to upload to the server

[ Save the code as a PHP file ]

Option 2.1: If you have saved the code as a PHP file you can upload the file separately and use this line of code below the <body> tag to access it

[ <?php include ("thefileyousaveabovename.php"); ?> ]

[ < Back ]                                                                 [ Next > ]

Titanic - 619 ▶ | View

Insert New    Delete Current

P™ PRODUCTS GENERATOR™
The e-commerce essential fm system
☒ Ecommerce
☒ Management
☒ System Get Products ▶

ID: 619

Movie: Titanic

Year: 1997

Director: James Cameron – 92 ▶

Link: Test

Vid_Image: Images/movies/titanic_120.jpg   Test – (Retrieve)   – (upload)

Vid_360: Images/movies/titanic_360.jpg    Test – (Retrieve)   – (upload)

CREATION OF EXPORT FILE TO FACILITATE CREATING AND UPDATING OF AFFILIATE WEBSITE

CROSS-REFERENCE TO RELATED APPLICATIONS

This application is a continuation of pending application Ser. No. 13/455,324, filed on Apr. 25, 2012, which is a continuation of application Ser. No. 12/586,797, filed on Sep. 28, 2009, now U.S. Pat. No. 8,190,491, which is a continuation of application Ser. No. 10/867,909, filed on Jun. 15, 2004, now U.S. Pat. No. 7,606,740, all commonly owned and assigned to the same assignee hereof. This application is also related to commonly-owned co-pending application Ser. No. 11/646,921, filed on Dec. 28, 2006, which is a continuation-in-part of application Ser. No. 10/867,909, now U.S. Pat. No. 7,606,740.

BACKGROUND

1. Technical Field

The present invention relates generally to electronic commerce and, more particularly, to a method for automating the process of searching for and acquiring commission-earning products offered for sale on one or more Vendor Websites and selectively incorporating the acquired products into an Affiliate Website.

2. Background Information

Over the past several years, use of the internet for the sale of goods and services has rapidly grown. Online shopping has become a routine method used by consumers for the purchase of goods and services and is supplanting some of the more traditional purchasing methods, such as mail-order catalogs and television shopping networks. The internet has made available to consumers countless sources of competitively-priced goods and services which may be selected, ordered, and received on an expedited basis (e.g., overnight) by a consumer without requiring the consumer to leave his or her home.

Various online mechanisms that enable comparative price shopping and product sampling and comparison are currently being utilized, and newer electronic commerce methods are continuously being developed to improve the online shopping experience. The convenience and ease of use of internet shopping has ensured the continued existence of this relatively new form of shopping. Although it is unlikely to replace retail outlets as the leading source of revenue for retailers, internet shopping is likely to continue in growth and to expand to other forms of communication mediums such as interactive television and wireless information networks.

The "vendor/affiliate" scheme has grown to become one of the most common methods used for the sale of goods over the internet. "Primary" or "stocking" online vendors are those that maintain an inventory of goods that are offered for sale on a so-called "Vendor Website". A Vendor Website is any website maintained by a primary vendor of goods or services through which such goods or services may be directly purchased by consumers. Vendor Websites typically contain HTML product code for each product offered for sale online. The product code includes graphical and text descriptions of the product along with pricing information and embedded links to the vendor's purchasing resource.

Some online vendors offer "registered affiliates" the ability to acquire these HTML product codes from their Vendor Website and incorporate them into an "Affiliate Website" to enable consumers to purchase the vendor's goods indirectly through the Affiliate Website, while offering the registered affiliate a commission for such sales. As used herein, the term "Affiliate Website" means any website maintained by a member of the general public who has become a registered affiliate of a Vendor Website. As will be appreciated, any website may theoretically serve as an Affiliate Website.

The vendor/affiliate scheme provides primary online vendors with the ability to dramatically increase sales by permitting their goods to appear for sale on an unlimited number of Affiliate Websites on the internet. Thus, for instance, the goods sold online at well-known Vendor Websites such as AMAZON.COM, ALLPOSTERS.COM, E-MERCHANDISE.COM, and ART.COM may be purchased directly through such Vendor Websites. Additionally, consumers may purchase goods sold by these primary vendors through a continuously increasing number of Affiliate Websites operated by non-stocking vendors. Many of the most commonly visited websites serve as Affiliate Websites for a large number of vendors.

In particular, many well-known Vendor Websites have accumulated large numbers of registered affiliates who have registered to become non-exclusive dealers of selected goods sold on the Vendor Website. The vendor/affiliate scheme provides the registered affiliate with the ability to operate a "virtual" mail-order house in a manner that is significantly easier to implement than the expense and burden associated with maintaining an inventory of goods. The vendor/affiliate scheme dispenses with the need for the operator of an Affiliate Website to maintain an inventory of merchandise and to create product codes for its goods. Moreover, the vendor/affiliate scheme provides registered affiliates with autonomy in that many primary vendors ship goods ordered through Affiliate Websites with the identity of the registered affiliate on the packing label so that it appears to consumers that the purchased goods originated from the registered affiliate rather than the primary vendor.

The vendor/affiliate scheme has proven to be a tremendously effective method for the sale of goods over the internet. There are currently over one million registered affiliates of the AMAZON.COM Vendor Website alone, and a significant portion of the revenue generated by many online vendors is actually generated by sales made by registered affiliates.

Despite its success, the conventional vendor/affiliate scheme remains elusive to most members of the general public because it is somewhat difficult and inconvenient to implement. Any person may become a registered affiliate by obtaining a unique "Affiliate Commission Number/ID", otherwise referred to as a "tracking number" from each vendor. By obtaining a tracking number, the operator of the Affiliate Website may then become a non-exclusive dealer of any of the products offered for sale on the Vendor Website.

However, the method of searching for products and incorporating such products into an Affiliate Website remains somewhat sophisticated and inconvenient. In order to search for products on a Vendor Website and incorporate corresponding product codes into an Affiliate Website, the registered affiliate must engage in a lengthy process with the Vendor Website. The registered affiliate must also insert the proper tracking number into the product code for each product incorporated into the Affiliate Website to ensure that a commission is duly paid to the registered affiliate for each sale made through the Affiliate Website. Sales occur when users visit the Affiliate Website and purchase goods from that website through a link to the Vendor Website incorporated into the product data.

A significant drawback currently associated with the conventional vendor/affiliate scheme is that it requires advanced knowledge and a substantial amount of time to implement. For instance, a keyword search for suitable products performed on the AMAZON.COM Vendor Website using a search term such as the name of a well-known movie (e.g., "TITANIC") would yield a random selection of hundreds of different products in many different product categories, such as pre-recorded movies on videocassette and DVD, wearing apparel, pre-recorded music, books, periodicals, various types of artwork, and the like, many of which a registered affiliate may have no interest in featuring on an Affiliate Website. Thus, the registered affiliate must manually select specific products of interest. Thereafter, the appropriate code must be generated for each of the selected products, the tracking number must be inserted into the product code for each product, and the Affiliate Website must be manually updated to incorporate the product data. This process requires substantial knowledge of website creation.

Furthermore, the conventional vendor/affiliate scheme requires the registered affiliate to generate the product code one at a time for each product of interest complete with the registered affiliate's unique tracking number inserted therein. Not only is the initial process of obtaining products of interest a tedious task, but the process of updating an Affiliate Website is also quite burdensome.

For example, AMAZON.COM refers to this conventional scheme as "Get HTML" because it results in searching for and "getting" the HTML product codes associated with products sold on the AMAZON.COM Vendor Website. However, the Get HTML process is cumbersome and complicated to use. For example, when the typical "Get HTML" process is performed by a registered affiliate on the AMAZON.COM website in search for a DVD of the movie "TITANIC", the registered affiliate must visit the AMAZON.COM Vendor Website, log in with his or her email address and password, activate a link to visit the so-called "Associates Central" section, and click on the "Build-A-Link" option to indicate that the registered affiliate wishes to create a link to the AMAZON.COM site on the Affiliate Website for a particular product. The registered affiliate must then click on the option "Individual Item Links" and then on the "Build Some" option. Thereafter, the registered affiliate must select the type of products required or leave the default setting as "All Products". A keyword (e.g., "TITANIC") is then entered by the registered affiliate, and the "Get HTML" process proceeds.

Upon completion, the registered affiliate must view all retrieved products and decide which are required, such as a DVD. Thereafter, the registered affiliate must click on the "Get HTML" button associated with the desired product and wait for the product data to be generated with the registered affiliate's unique tracking number inserted therein. Once this process is complete, the registered affiliate must copy all the generated code to the "clipboard" of a suitable computer program and then paste the copied code into the registered affiliate's database or web page. The database or web page is then saved and uploaded to a server on which the Affiliate Website is located.

Aside from the large number of manual steps involved in the "Get HTML" process and other like processes, the conventional method for acquiring product codes in the online vendor/affiliate scheme is also very slow because only one set of product codes can be generated at a time. If a large number of product codes are required, a considerable amount of time and manpower are required.

A somewhat faster method is the so-called "Keyword Links" method, which allows registered affiliates to acquire multiple products displayed on a Vendor Website for incorporation into an Affiliate Website. However, this known method is also complicated and time-consuming. This method is enabled when the registered affiliate clicks on the "Keyword Links" button of the AMAZON.COM website and selects the type of products required (such as a DVD) from a list, along with a keyword (e.g., "TITANIC"). The registered affiliate then views retrieved products within graphic boxes generated by AMAZON.COM while selecting the required box to display, i.e., a DVD. The remaining steps are identical to those of the "GET HTML" method.

Similarly, the "Virtual Shop" scheme on ALLPOSTERS.COM allows a user to enter a keyword to search for multiple products. The user can then select which products to retrieve.

Aside from the time-consuming nature of some of the conventional methods described above, another drawback of these methods is that the products obtained can only be contained and displayed in a so-called AMAZON box, which is a fixed box having a format and location specified by the vendor. For instance, some of the existing scripts available to registered affiliates do not allow much control over where and how AMAZON.COM products are displayed on Affiliate Websites. In addition, with some of these scripts, it is not possible to display more than the number of products that an AMAZON.COM box can contain, which is currently limited to a maximum number of 8 products.

A lengthy log-in process for some of these scripts is currently necessary to enable a vendor to generate the registered affiliate's unique tracking number and incorporate it into the product code of the searched for and selected product. There is no currently available method or system that allows a registered affiliate to automatically search a plurality of Vendor Websites and retrieve multiple products from a single keyword list while automatically inserting a registered affiliate's unique tracking number for each Vendor Website into the retrieved product codes before displaying and marketing such products on an Affiliate Website.

In view of the foregoing shortcomings of the prior art, there is a need for a method capable of automating the process of acquiring commission-earning product codes for one or more products offered for sale on one or more Vendor Websites, selectively incorporating the acquired product codes into an Affiliate Website, and updating or replacing the product codes in the Affiliate Website as desired. There is a further need for an intuitive, easy-to-use computer program that can be used or easily updated for use with any and all Vendor Websites and vendor/affiliate schemes without requiring affiliates to learn new systems and methods each time a new Vendor Website or product search scheme is introduced.

SUMMARY

It is, therefore, an object of the present invention to provide an improved method for electronic commerce and, in particular, an improved method for searching for and retrieving products of interest from Vendor Websites.

Another object of the present invention is to provide a method for automating the process of searching for and retrieving products of interest from one or more Vendor Websites.

Still another object of the present invention is to provide a method for searching for and retrieving commission earning products from one or more Vendor Websites and inserting such products into an Affiliate Website.

A further object of the present invention is to provide a simplified method for searching for and retrieving commission earning products from a plurality of Vendor Websites using a single keyword list and inserting such products into an Affiliate Website.

Yet another object of the present invention is to provide a method for retrieving product codes for commission earning products from one or more Vendor Websites and building a products database containing the products codes.

Still yet another object of the present invention is to provide a method for searching for and retrieving products of interest from one or more Vendor Websites, which stores a previously input unique registered affiliate tracking number for each Vendor Website and incorporates the correct tracking number into product codes retrieved from the respective Vendor Websites prior to storage of the product codes in a database associated with an Affiliate Website, to thereby eliminate the need for performing a lengthy log-in and product search process each time a search for new products is conducted.

Yet a further object of the present invention is to provide a method and system for retrieving product codes for commission earning products from one or more Vendor Websites and inserting the product codes into an Affiliate Website.

Still yet a further object of the present invention is to provide a method for updating or replacing products contained in an Affiliate Website directly from the Vendor Website.

In accordance with one aspect of the present invention, a method for retrieving product codes from one or more Vendor Websites over a network comprises the steps of storing on a client computer a unique tracking number for identifying a Registered Affiliate for each of one or more Vendor Websites, storing a list containing one or more keywords on the client computer, using the client computer to establish a connection to a Vendor Website over the network, searching the Vendor Website for products for sale using the one or more keywords stored on the client computer, and retrieving product codes from the Vendor Website for products identified by the search.

In accordance with the foregoing aspect of the present invention, an improved method is provided for automating the search and retrieval of commission earning products from one or more Vendor Websites. More specifically, a program is executed on a client computer that prompts a registered affiliate to enter a unique registered affiliate tracking number for each of one or more Vendor Websites and to enter a list of keywords to be used for searching the Vendor Websites for products of interest. The list of keywords may comprise any words of interest, such as titles of movies, books, and the like, or names of celebrities, actors, performing artists, sports Figures, authors, and the like. From the list of keywords input by the registered affiliate, the inventive method automatically logs onto and searches through any of the one or more Vendor Websites and identifies and retrieves products related to the keywords. Once the products have been retrieved, the inventive method automatically incorporates the previously stored registered affiliate's unique tracking number into each specific product code and inserts the product codes into the registered affiliate's Affiliate Website to guarantee payment of a commission from the vendor to the registered affiliate for each successful sale made through the Affiliate Website.

The method of the present invention automatically, from a given keyword or list of keywords, searches for products on a previously selected Vendor Website. The inventive method retrieves the product code for each identified product, complete with all the coding necessary to reference the products. The inventive method then inserts the registered affiliate's unique tracking number into each individual product code and inserts the product codes into the Affiliate Website to ensure that the registered affiliate is credited with the appropriate commission from the vendor for each successful sale made through the Affiliate Website.

The inventive method is highly automated and fast, as opposed to the lengthy and slow system currently used on most Vendor Websites. For instance, the inventive method allows multiple products to be retrieved from multiple Vendor Websites without requiring the user to re-enter the same search criteria for each Vendor Website.

Once products of interest have been retrieved from a Vendor Website, a products database is set up and a control panel allows infinite selection, de-selection, updating and replacement of retrieved products from the products database so that only selected products appear on the Affiliate Website. Some AMAZON boxes can only display up to 8 products. The inventive method can generate a larger number, for instance, as many as 10 but not limited to 10 products to display. AMAZON boxes also incorporate banners. Preferably, the inventive system does not incorporate banners and can output data in many different formats including, but not limited to, CSV, SQL and PHP.

BRIEF DESCRIPTION OF THE DRAWINGS

FIGS. 2-14 are images displayed on a computer monitor by the Product Search Section during execution of the Products Generator computer program;

FIGS. 16-30 are images displayed on a computer monitor during execution of the Website Database Wizard of the Products Generator computer program;

FIGS. 36-37 are images of the EMS E-commerce Management System of the Products Generator Computer program.

DETAILED DESCRIPTION

Figure 1A:
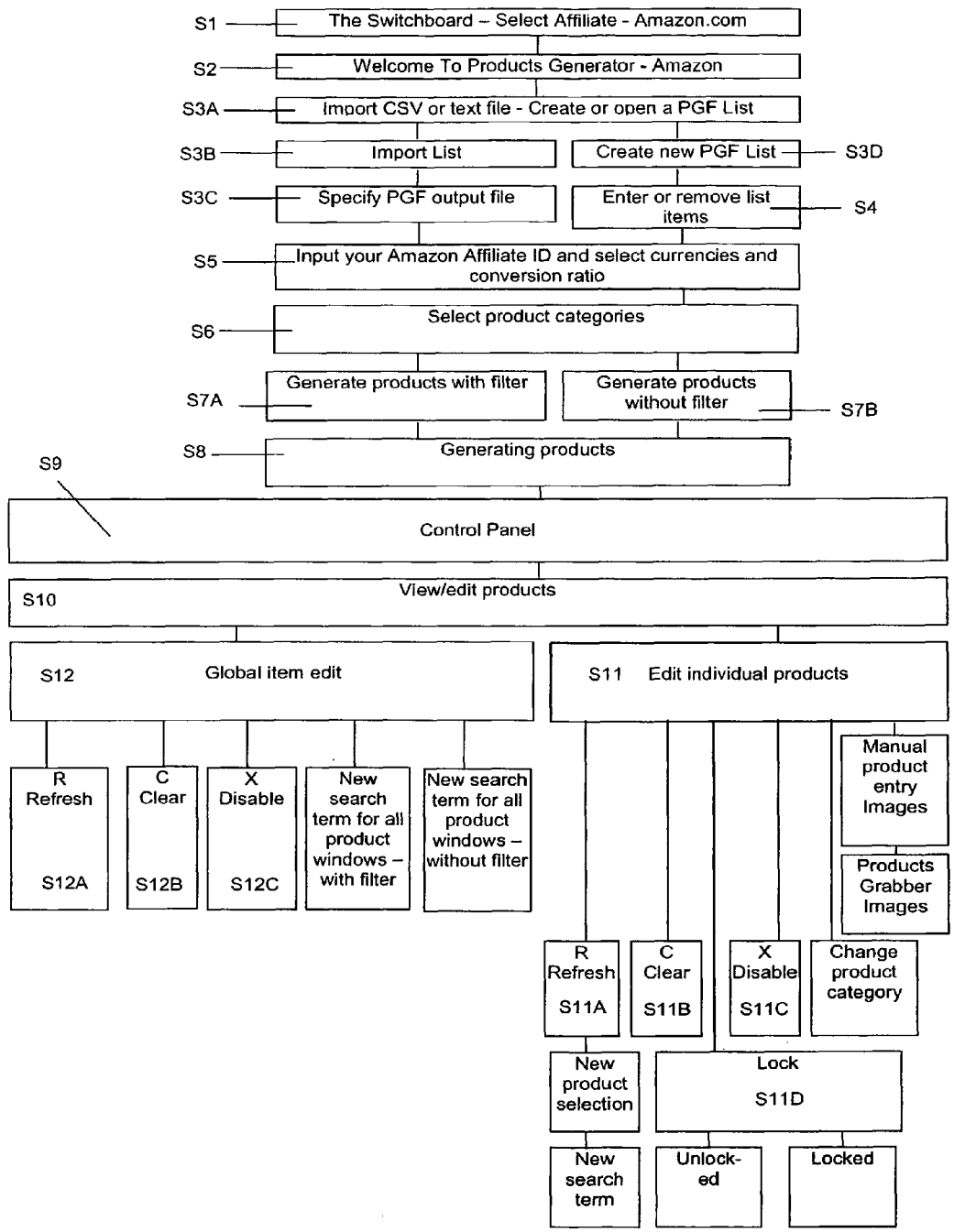
FIGS. 1A and 1B are flowcharts illustrating operation of the Products Generator computer program in accordance with a preferred embodiment of the present invention.

A preferred embodiment of the present invention will be described hereinafter in connection with a computer program named "Products Generator", which was written by the present inventors.

As used herein, the names "Products Generator", "e-commerce essential", "E-commerce Management System", "Product Grabber", "Website Database Wizard", "EMS Integrator", "Control Panel Wizard", "Products Database", "Product Window", "Refresh Window", and "Special Feature Products Database" are trademarks for the computer program described herein and are owned by the present inventors.

The Products Generator computer program is a comprehensive software package contained on a removable storage medium such as a CD. The Products Generator program is loaded onto and executed by a client computer operated by a registered affiliate. The client computer is preferably a typical personal computer running the Microsoft Windows operating system or any other suitable operating system such as Apple OS or Linux. In addition, the client computer is connectable to a client/server network, preferably the internet, and is capable of accessing one of more Vendor Websites over the network.

The Affiliate Website may reside on the client computer, but preferably resides on and is hosted by a remote server that is accessible by the client computer and other computers over the network. The other computers include computers operated by consumers for making e-commerce purchases over the internet.

As described hereinafter, the Products Generator computer program provides users with a turnkey, fully automated system for acquiring one or more commission earning products for sale from one or more participating Vendor Websites, and creating or updating an Affiliate Website to include any or all of the acquired products.

The Products Generator program automates the process of searching for and retrieving products from Vendor Websites. The Products Generator program is an easy-to-use, user-friendly GUI-based software package that allows a user who has become a registered affiliate of one or more participating Vendor Websites to automatically search those Vendor Websites for products of interest.

In order to commence an automated product search of Vendor Websites, the registered affiliate is required to enter a list of keywords relating in some manner to products of interest to be searched for and retrieved from each Vendor Website. In response, the Products Generator program automatically retrieves all required product codes and inserts the registered affiliate's unique tracking number for each Vendor Website into retrieved product codes before the display and marketing of such products on the Affiliate Website. The Products Generator program stores the registered affiliate's unique tracking number for each Vendor Website and automatically incorporates the correct tracking number into all product codes retrieved from the respective Vendor Websites prior to storage of the product codes in a Products Database to guarantee payment of a commission from the respective vendor to the registered affiliate for each successful sale.

Accordingly, the Products Generator program automates the process of searching for, retrieving and incorporating product codes into an Affiliate Website and avoids the need for the registered affiliate to go through a lengthy log-in and product search process as required by some vendors and described above in connection with some of the conventional vendor/affiliate methods.

The Products Generator program provides an intuitive user interface and provides a highly automated and fast method for selectively retrieving commission earning products from one or more Vendor Websites as compared to the time-consuming manual method currently used in connection with most Vendor Websites that offer registered affiliates the capability to acquire product information online.

As described below, the Products Generator program also provides a "Website Database Wizard" that automatically imports acquired product codes into an existing Affiliate Website. Alternatively, the Website Database Wizard assists the registered affiliate in creating an Affiliate Website. In addition, the Products Generator program includes a Control Panel Wizard that generates a "live on the Internet" Control Panel specific to each particular vendor. The Control Panel allows the registered affiliate to update the Affiliate Website in real time by enabling the registered affiliate to refresh products via new product searches, and also enables the updating, validation, selection and deselection of retrieved products from the products database so that only selected products appear on the Affiliate Website.

In addition, as well being able to update and validate products stored in the Products Database, the Products Generator program is also capable of displaying products in "real time" from the Affiliate's website.

Accordingly, the Products Generator computer program is organized in four distinct sections, including: (1) a Product Search Section for searching for and retrieving products from Vendor Websites in a fully automated, semi-automated, or manual manner; (2) a Website Database Wizard for assisting the registered affiliate in creating an original Affiliate Website complete with all the necessary code for the display of retrieved products, via template pages or by means of individual scripts; (3) a Control Panel Wizard for allowing a registered affiliate to create a "live" on the internet control panel to enable the registered affiliate to edit retrieved products directly from an Affiliate Website by validating, selecting and de-selecting retrieved products from a products database so that only selected and current products appear on the Affiliate Website; and (4) an E-Commerce Management System which allows the registered affiliate to conduct product searches of Vendor Websites directly from an Affiliate Website. Each of these distinct sections is described separately below.

(1) Product Search Section

Figure 1B:
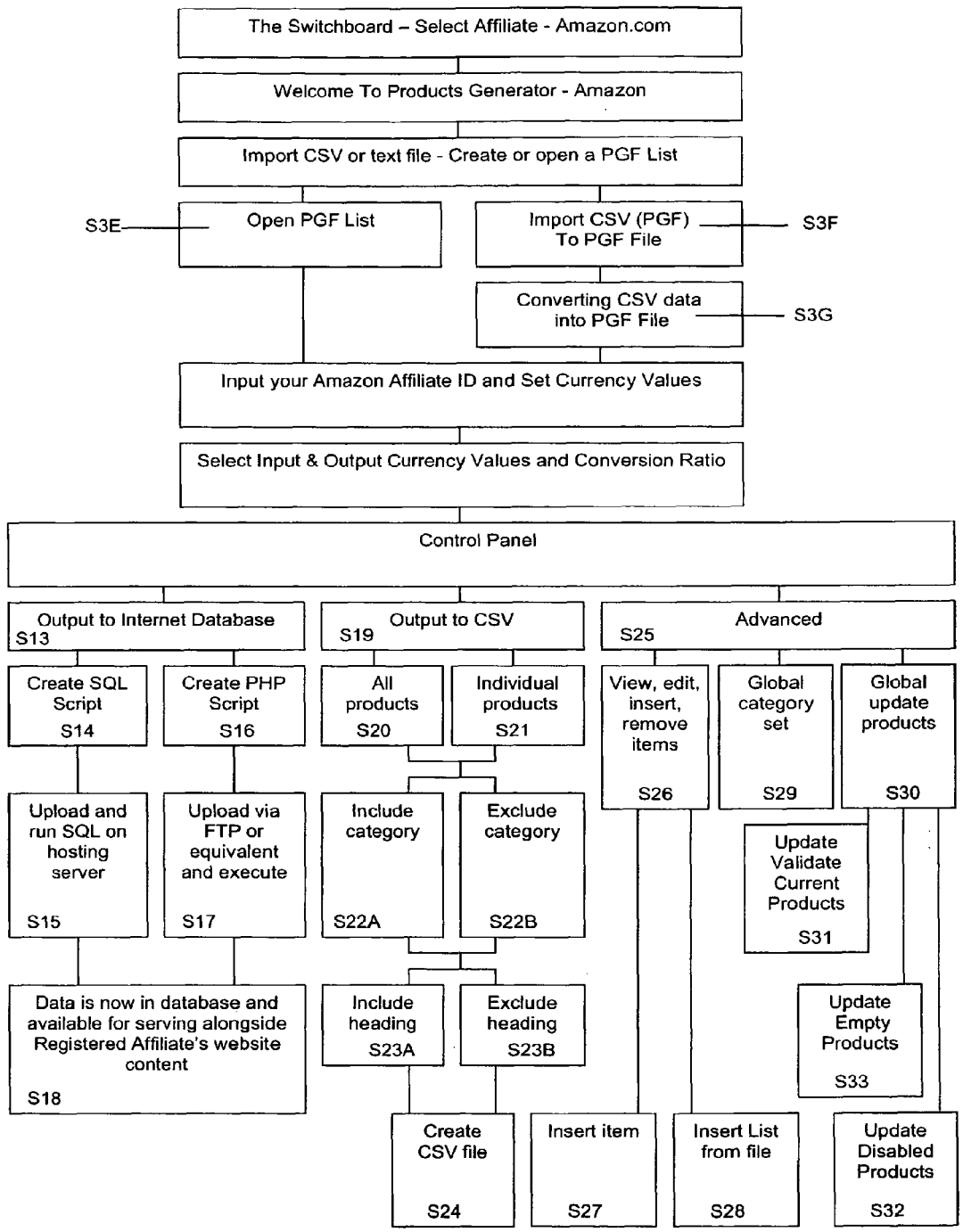

FIGS. 1A and 1B are a flowchart illustrating many of the various functions performed by the Product Search Section of the Products Generator software package in connection with a single Vendor Website. As will be readily apparent to those of ordinary skill in the art, the same or similar functions are performed for additional or different Vendor Websites.

In order to simplify the process of acquiring products from Vendor Websites, the Products Generator program provides a user-friendly interface which provides step-by-step instructions and prompts the registered affiliate to enter text and other required data into simple text boxes and to make selections using familiar data input devices such as check boxes and pull-down menus.

FIGS. 2-14 illustrate the user interface of the Product Search Section of the Products Generator program. More specifically, FIGS. 2-14 are screen images or screen shots of images displayed on a monitor of the client computer during operation of the Products Generator program. Thus, FIGS. 2-14 illustrate what the registered affiliate or other user of the Products Generator program would view on a computer monitor when running the program on a typical personal computer.

As will be appreciated by those skilled in the art, the Products Generator program is designed with an intuitive user interface that utilizes selectable "buttons", text boxes, check boxes, and the like, in the same manner as countless other computer programs designed for use with the Microsoft Windows and Apple Operating Systems. During use, the Products Generator program requires users to make various selections by clicking on various buttons or check boxes and prompts the user to enter text into text boxes.

The functional characteristics and operation of the Product Search Section of the Products Generator program will now be described hereinafter with reference to the flowchart of FIGS. 1A and 1B and the screen images of FIGS. 2-14.

Figure 2:
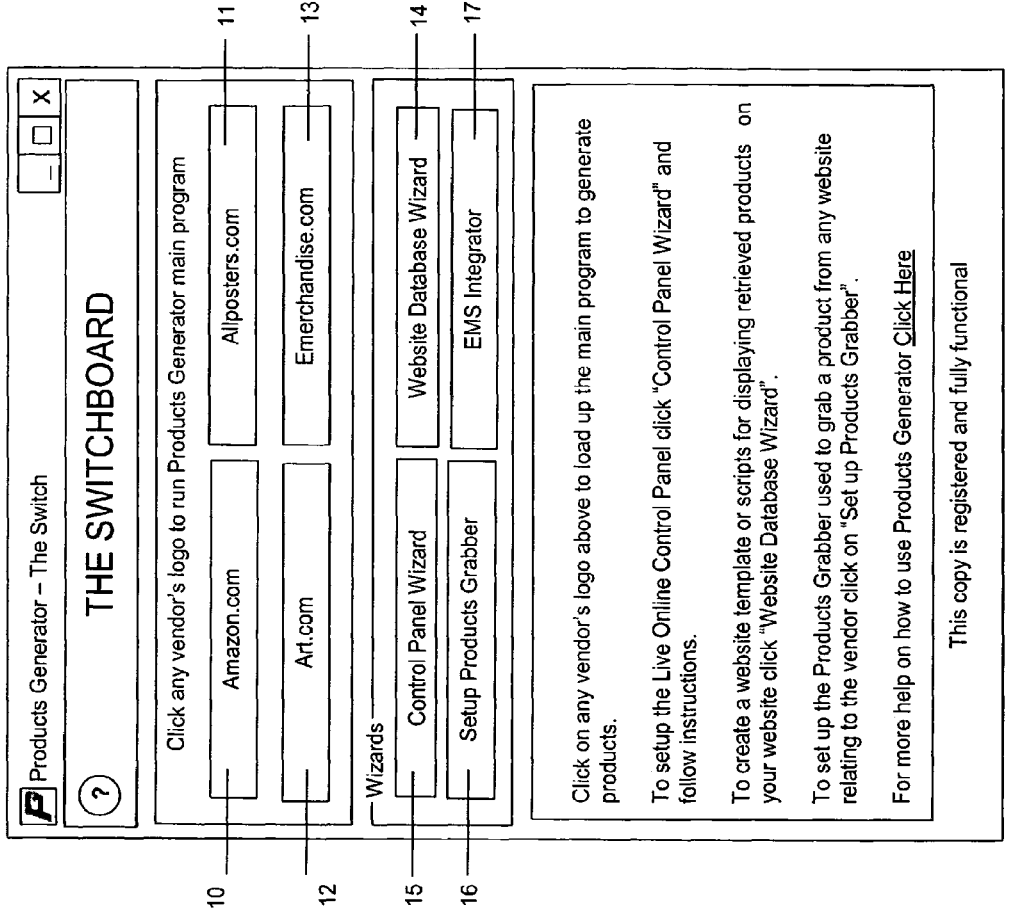

When the Products Generator program is first activated, it generates a "Switchboard" screen (Step 1). FIG. 2 is an image of the Switchboard screen. The Switchboard screen displays various user-selectable options each of which launches a different Products Generator software routine.

In particular, the Switchboard screen includes Vendor Website selection buttons 10, 11, 12, 13 for allowing selection of any one of a plurality of participating Vendor Websites from which goods may be searched for and selected by the registered affiliate. When any one of the Vendor Website selection buttons 10-13 is clicked on by the user, the Products Generator program launches a product search routine for conducting a search for products on the selected Vendor Website.

In the presently described embodiment, Vendor Website selection buttons are provided for AMAZON.COM 10, ALLPOSTERS.COM 11, E-MERCHANDISE.COM 12, and ART.COM 13. This is not intended to limit the scope of the present invention. As will be appreciated by those skilled in the art, a different software routine is provided in the Products Generator software package for each Vendor Website that is searchable. Although product searches of all Vendor Websites are performed using string searches, the search routines contained in the Products Generator program differ from each other based on the unique steps required by the respective online vendors to access the Vendor Website, search for products, and acquire product codes. Thus, the steps performed by the Products Generator program for each respective Vendor Website differ slightly in terms of the way they access product codes based upon differences in the format and location of product codes in each Vendor Website. The Products Generator program includes a different product search software routine unique to each Vendor Website that can be accessed.

Although the presently described embodiment of the Products Generator program includes only the four Vendor Websites mentioned above, the Products Generator program may be limited to one Vendor Website or updated to include additional or different Vendor Websites by adding new software routines for accessing such Vendor Websites in accordance with the teachings of the present invention. Also, as described below, the Products Generator program further includes a Product Grabber software routine that allows users to acquire codes from any Vendor or Affiliate Website that offers products for sale online.

Referring again to FIG. 2, in addition to the Vendor Website selection buttons 10-13, the Switchboard screen also includes a Website Database Wizard selection button 14 that launches a Website Database Wizard software routine for assisting the registered affiliate in creating an original Affiliate Website complete with all the necessary code for display of the retrieved products, via template pages or by means of individual scripts. In addition, the Switchboard screen includes a Control Panel Wizard selection button 15 that launches a Control Panel Wizard software routine that sets up a control panel that can be accessed directly from the Affiliate Website without requiring the user to load and execute the Products Generator program.

Thus, the Control Panel Wizard sets up a live control panel that is unique to each respective vendor for allowing the registered affiliate to validate, select or de-select products from the products database, directly from the Affiliate Website, so that only selected and current products appear on the Affiliate Website. The Switchboard Screen also includes a Setup Products Grabber button 16 and an EMS Integrator button 17. Each of these features of the Products Generator software package are described in separately-labeled sections below.

In the presently described embodiment of the Products Generator computer program, the Switchboard screen remains "open" or "active" to enable the registered affiliate to select any one of the buttons 10-17 at any time during operation of the Products Generator program. In other words, the Switchboard Screen remains in the background and may be selectively called up and moved to the foreground to allow the registered affiliate to conduct additional product searches or launch one of the wizards.

When the registered affiliate selects one of the Vendor Website selector buttons 10-13 by clicking on the selected button, the Product Search section commences a search for products on a respective Vendor Website based upon a newly-created or previously-stored keyword list. In the following description, it is assumed that the user has clicked on the AMAZON.COM button 10.

Figure 3:
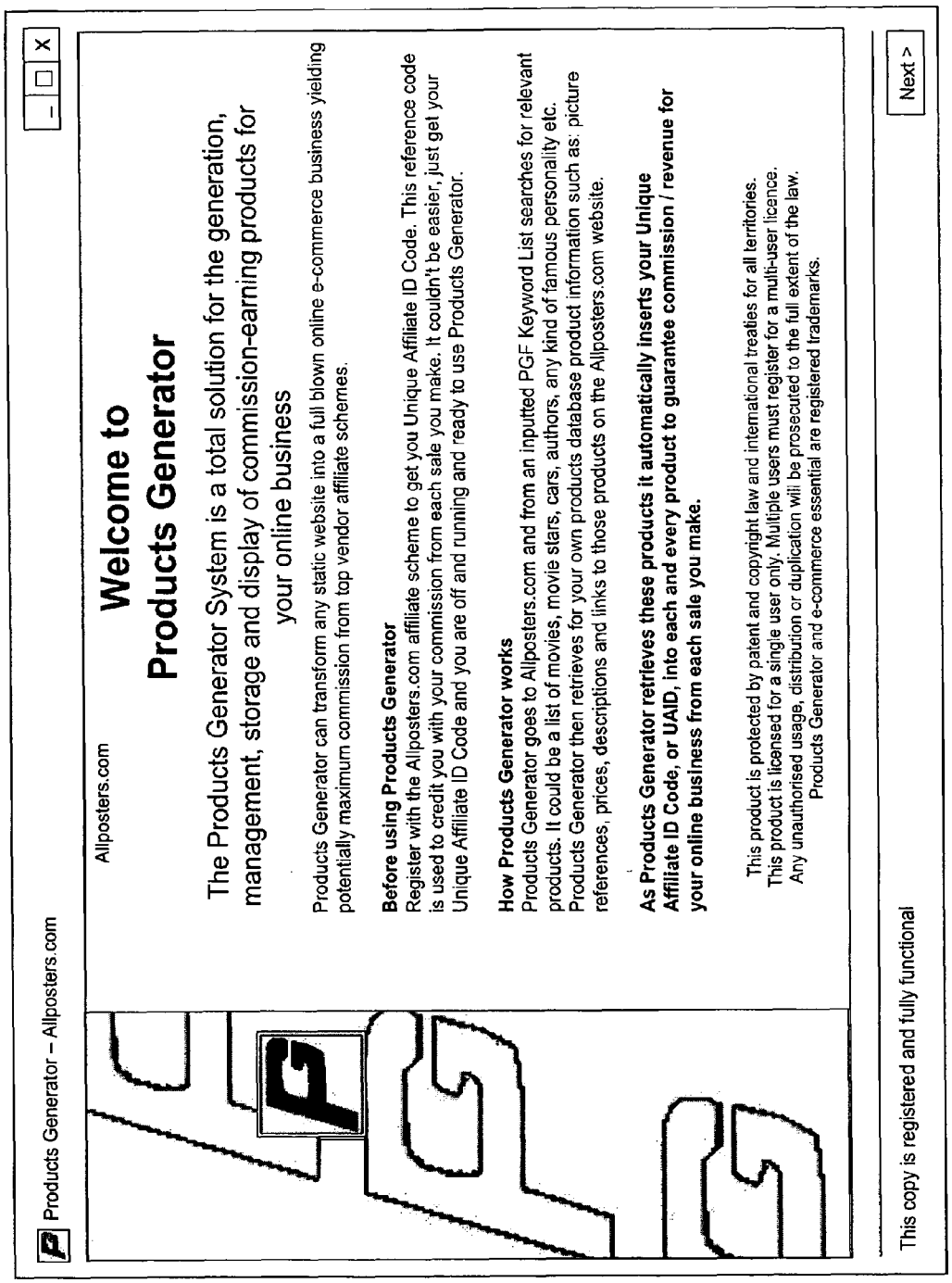

Prior to commencing the search, the Product Search section displays a Welcome Screen to advise first-time users of the functional characteristics of the Products Generator program (Step 2). As shown in FIG. 3, the Welcome Screen contains instructions and descriptive text to explain the purpose of the Products Generator program.

More specifically, the Welcome Screen advises users that they must register with one or more of the participating Vendor Websites shown in the Switchboard of FIG. 2 to obtain a unique tracking number which is used to credit the registered affiliate with a commission from each sale made on the Affiliate Website.

The Welcome Screen further advises users that the Products Generator program goes to a selected Vendor Website and, from a list of products that the user has input as keywords, searches the Vendor Website for relevant products, and retrieves for the user's database product codes consisting of images, prices, descriptions and links for those products.

In addition, the Welcome Screen advises users that as the Products Generator program retrieves this information, it automatically inserts the registered affiliate's unique tracking number into the product code for each selected product to guarantee commission for the registered affiliate's business for each sale made. Accordingly, the Welcome Screen provides first-time users of the Products Generator program with an overview of the program which simplifies operation thereof.

Figure 4A:
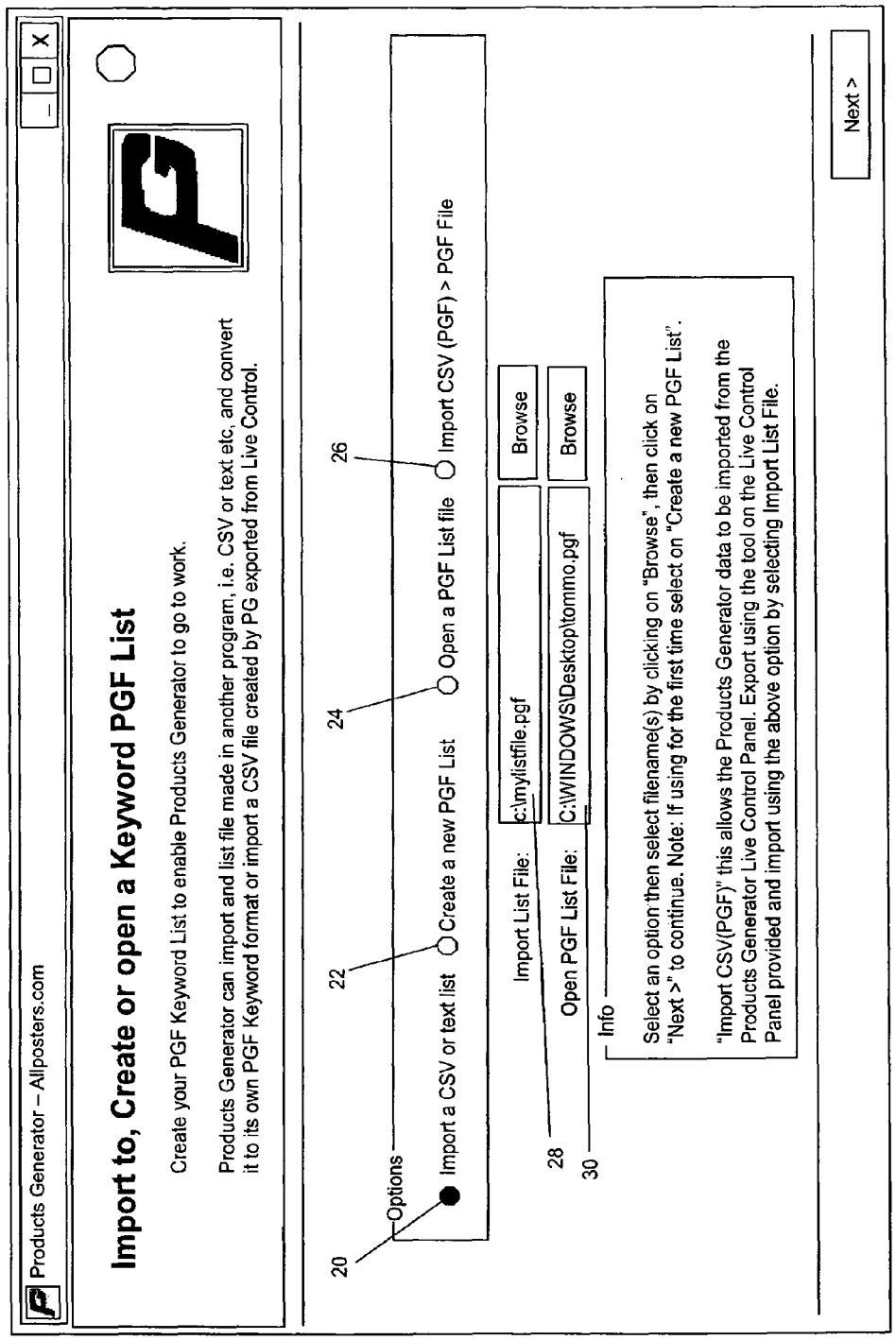

When the user clicks on the "Next" button at the bottom right-hand side of the Welcome Screen using a mouse or other appropriate input device, the Products Generator program proceeds to display the image shown in FIG. 4A (Step 3A). Thus, the next screen can be displayed once the user has read the contents of the Welcome Screen. Users who are already familiar with the features of the Products Generator program may quickly proceed to the next screen without reading the contents of the Welcome Screen.

In order for the Products Generator program to automatically search a Vendor Website for products of interest and acquire product codes for incorporation into an Affiliate Website, the user must first create a keyword list for use by the Products Generator program to search for such products on a Vendor Website. The Products Generator program does this in an automated manner as described below.

FIG. 4A illustrates a list creation screen that is displayed when the user has selected the AMAZON.COM button 10 in the Switchboard screen of FIG. 2. The Products Generator program refers to such lists as "PGF" files, which is an abbreviation for "Products Generator File". Products Generator Files are lists formatted by the Products Generator program.

The list creation screen shown in FIG. 4A includes check boxes 20, 24 and 26, which permit previously-created lists to be imported. Such lists may be in the PGF format, meaning that they have been created or modified by the Products Generator program, or in another known format. In addition, the list creation screen includes a "Create a New PFG List" check box 22 to enable the user to create a new list.

When a list has been created by the user in a previous session using the Products Generator program or using another program or application, such as a word processing program, the user would select the appropriate one of the "Import" check boxes 20, 24, or 26 to open such list. When a list created by another program is imported into the Products Generator program, the list is converted into a PGF file. Such lists may be in the form of, for example, text files, the known CSV format, or any other format suitable for such purpose. Another "Import" check box 26 is used to import a list exported from a Live Control Panel (described below) (Steps 3F, 3G).

The "lists" of keywords referred to herein may be a list of any searchable terms for which products may exist, such as titles of movies, television shows, books, names of movie stars, celebrities, personalities, cars, sports teams or figures, and the like. There are no particular limits to the type or number of words or categories that may be included in such lists.

In the list creation screen shown in FIG. 4A, the user has clicked on the "Import a CSV or text list" check box 20 and entered the name and location of the list to be imported by clicking on a text box 28 and entering the name ("C:\mylistfile.CSV") therein (Step 3B). The registered affiliate has also clicked on a text box 30 and entered the name ("C:\WINDOWS\Desktop\tommo.pgf") under which the PGF file is to be stored. Thus, when a CSV list is imported into the Products Generator program, it is converted into the PGF format and stored with the file name entered by the user in the text box 30 labeled "Output PGF Files" (Step 3C.)

Figure 4B:
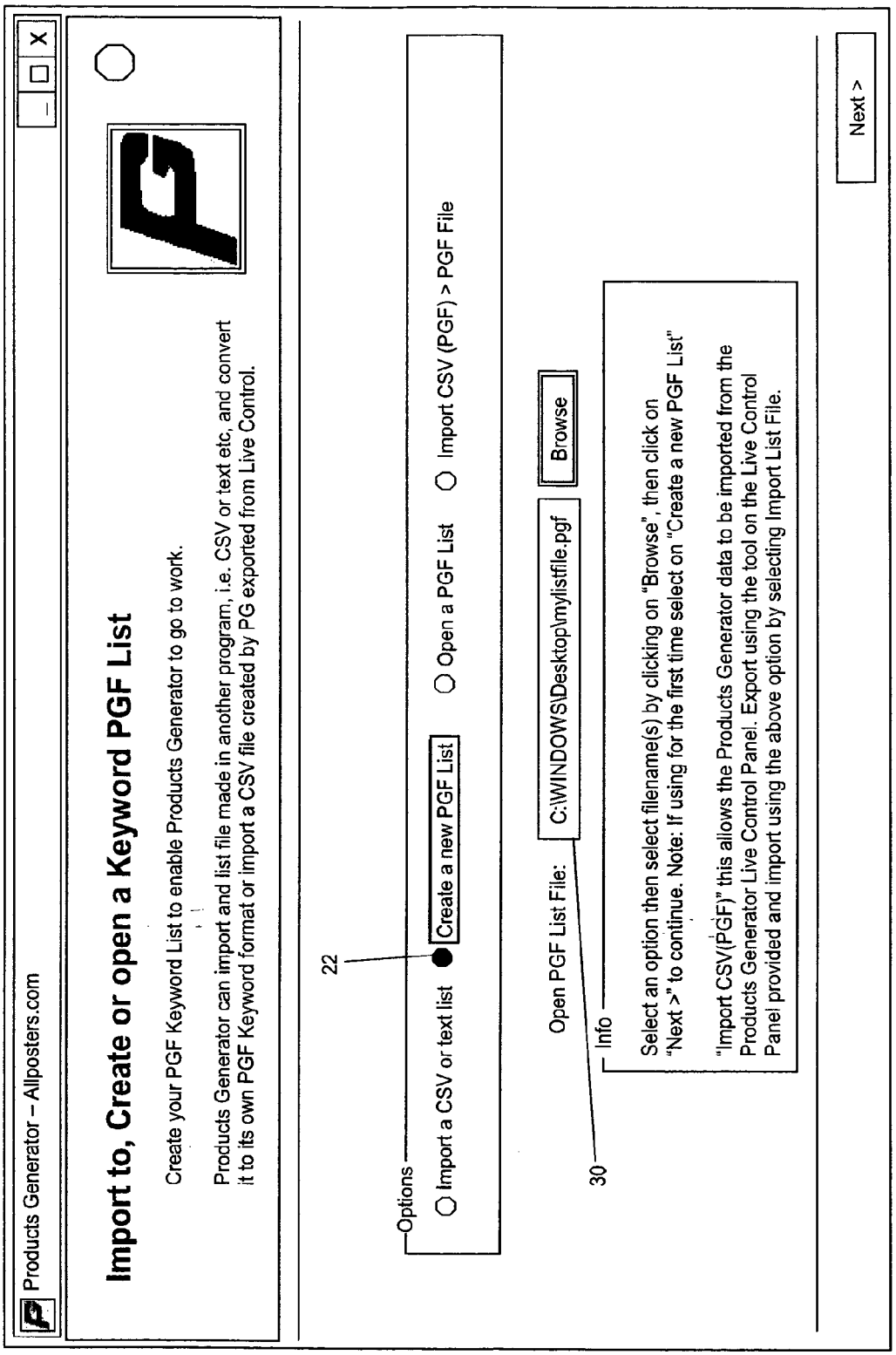

FIG. 4B illustrates a list creation screen that is similar to that shown in FIG. 4A, but in which the registered affiliate has clicked the "Create a new PGF list" check box 22 and provided a name and location for this list ("C:\WINDOWS\Desktop\mylistfile.pgf") in the text box 30 (Step 3D).

Figure 4C:
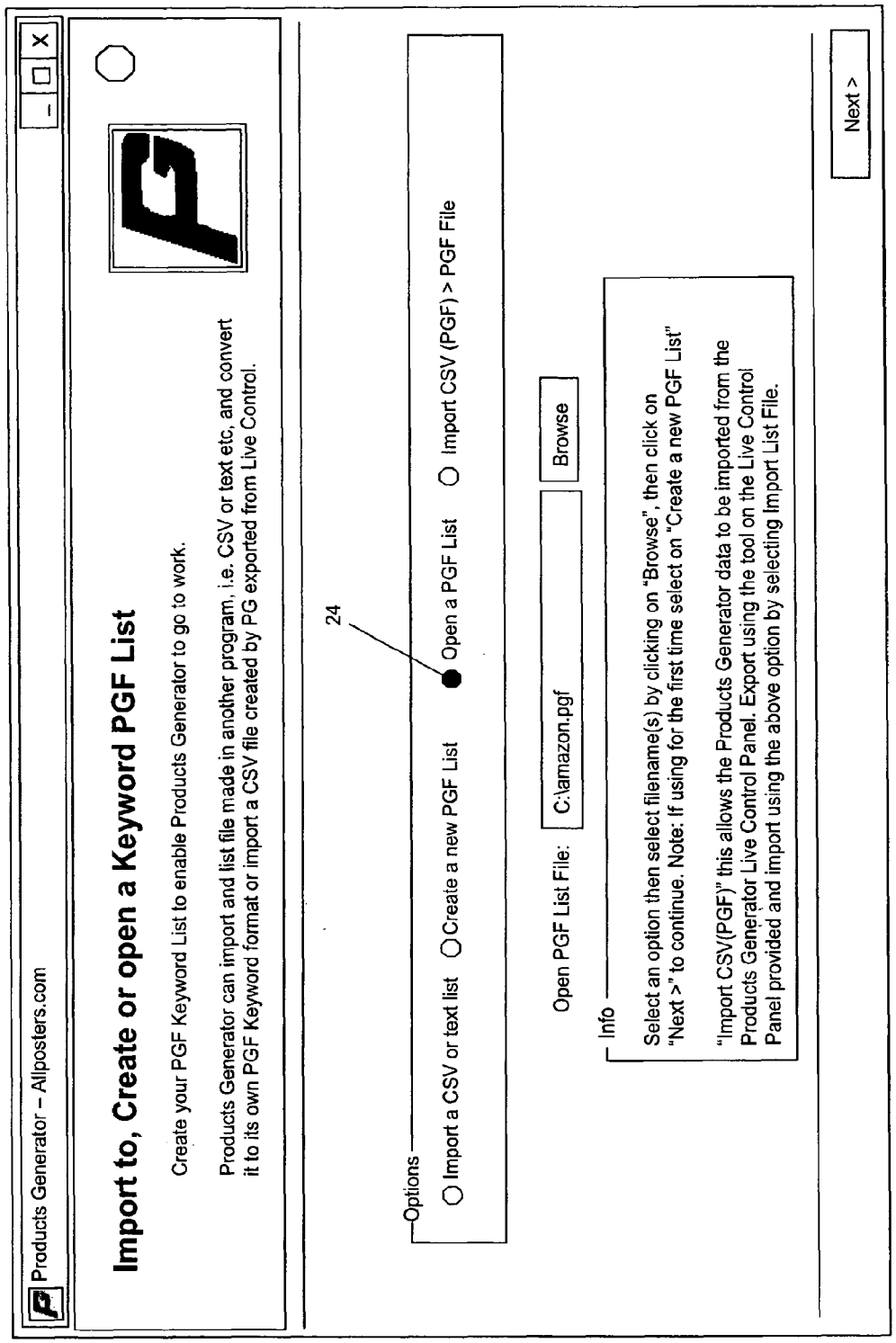

Similarly, FIG. 4C is an image of the same screen shown in FIGS. 4A and 4B. In FIG. 4C, however, the user has clicked on the "Open a PGF list file" checkbox 24 and has provided a name and location for this list (C:\amazon.pgf) in a text box 32 (Step 3E). This option opens a list that was previously stored as a PGF list.

Figure 5:
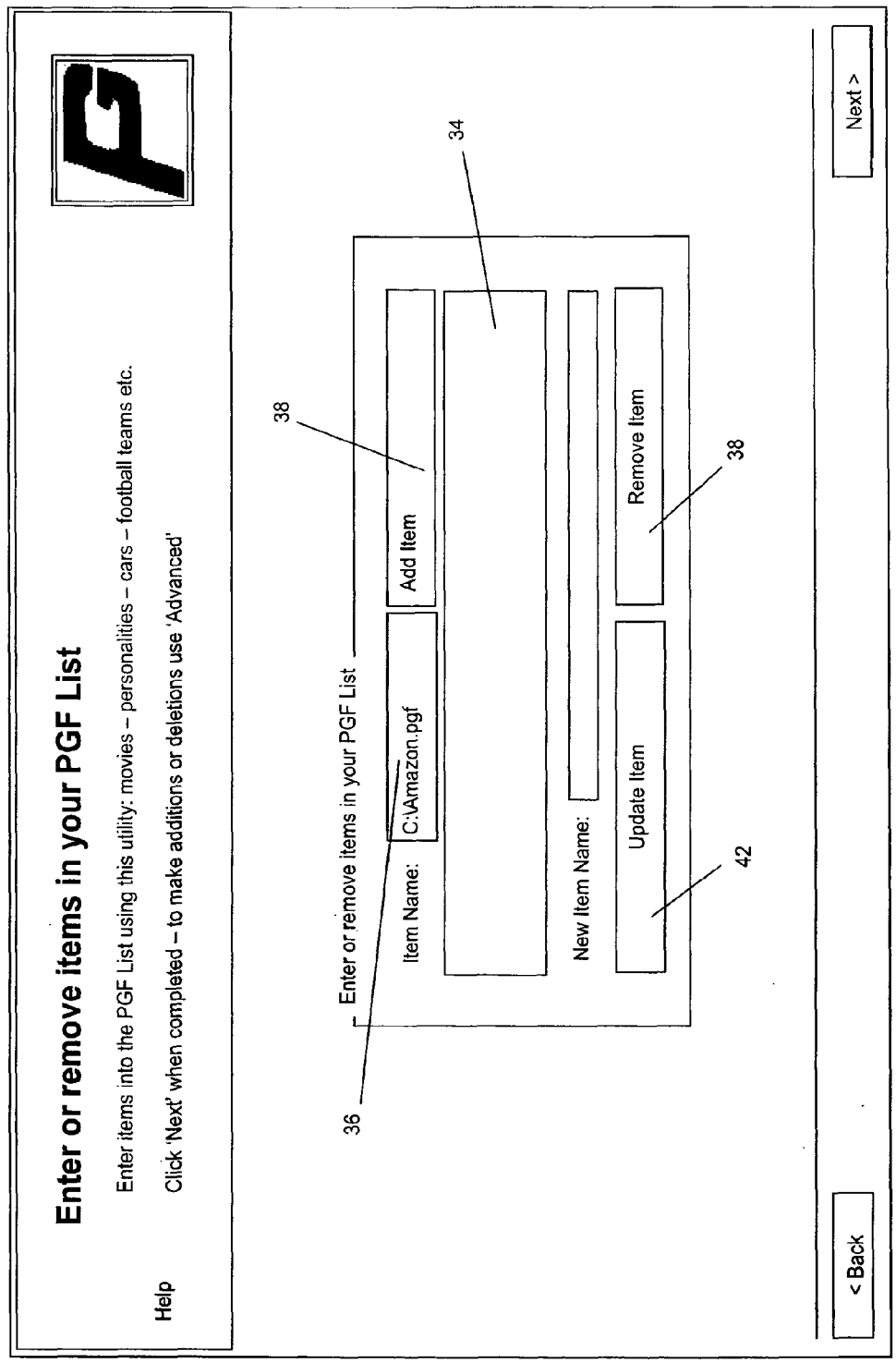

When the user clicks on the Next button in the screen shown in FIG. 4B, the screen image shown in FIG. 5 is displayed by the Products Generator program (Step 4). In this image, a text box 34 is provided that contains the items contained in the list to be created. The user may add or remove items from the displayed list by typing the name of the item in the "Item Name" text box 36 or highlighting the name in the text box 34 and clicking on the appropriate Add Item button 38, Remove Item button 40 or Update Item button 42. Items inserted in the text box 34 may also be removed or updated by highlighting the items and clicking on the Remove Item button 40 or the Update Item button 42. PGF files are lists entered into the textbox 34 shown in FIG. 5 to enable the Products Generator program to search for products on a selected Vendor Website.

Figure 6:
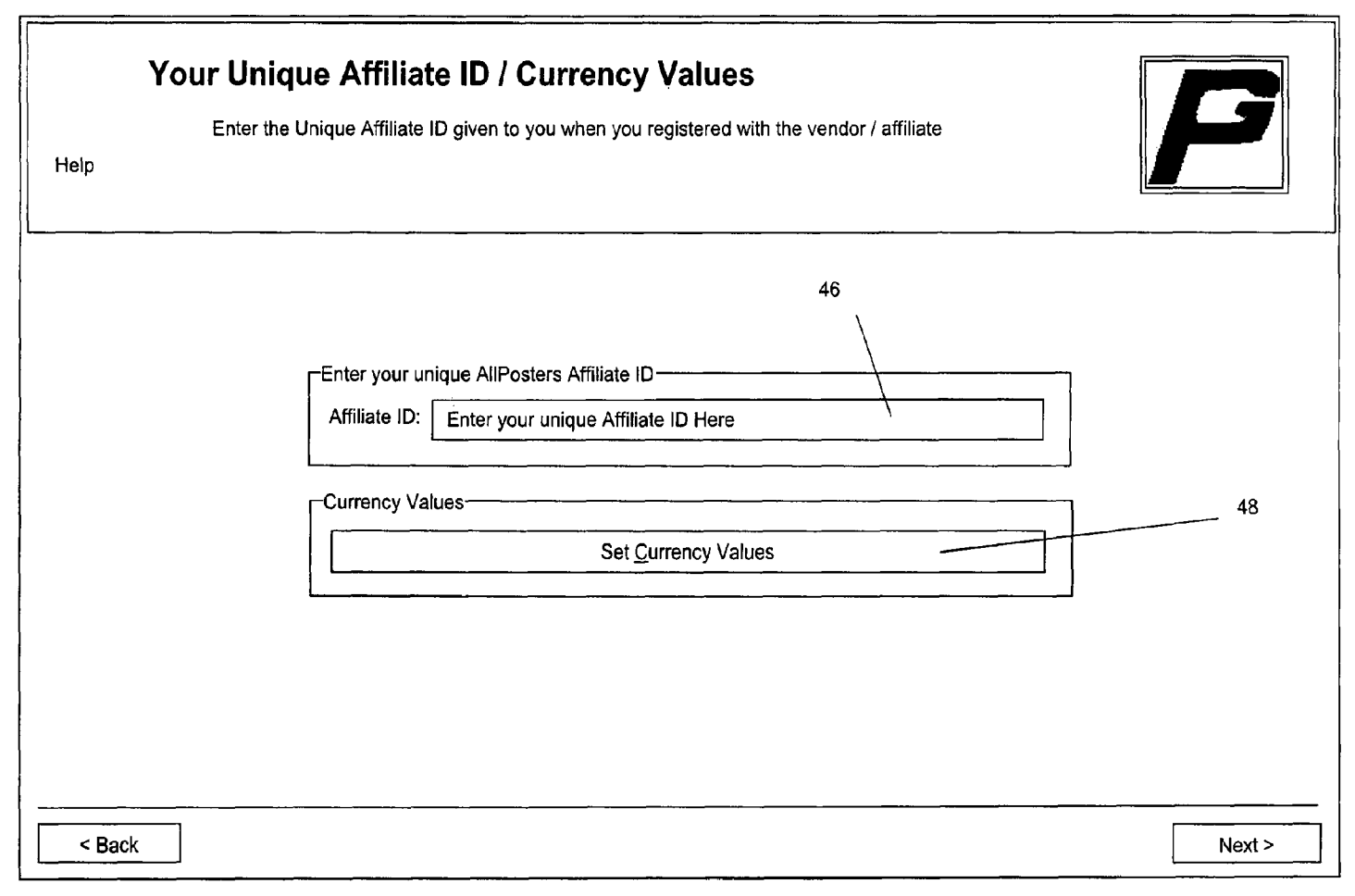

When the user clicks on the Next button in FIG. 5, the image illustrated in FIG. 6 is displayed by the Products Generator program (Step 5). In FIG. 6, the registered affiliate is prompted to enter in a textbox 46 the Affiliate tracking number provided by the particular vendor which, in this case, is AMAZON.COM. Thus, in the illustrated example, the Products Generator program prompts the user to enter the tracking number provided by the AMAZON.COM website. The image shown in FIG. 6 is also displayed after the user has clicked on the Next button after the user has clicked on the "Open a PGF List File" option 24 in FIG. 4A. In addition, the registered affiliate is provided with a Set Currency Values button 48 for launching a currency setting routine, which will be described below.

If the registered affiliate has opened a previously saved PGF list in the list creation screen of FIG. 4C, the previously-stored Affiliate ID associated with that list is displayed and need not be re-entered again in FIG. 6. The tracking number is inserted into all retrieved product codes for a respective vendor and is used by the vendor to pay commissions for online product sales made through the registered affiliate's Affiliate Website.

Figure 7:
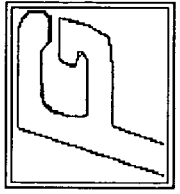
Figure 8:
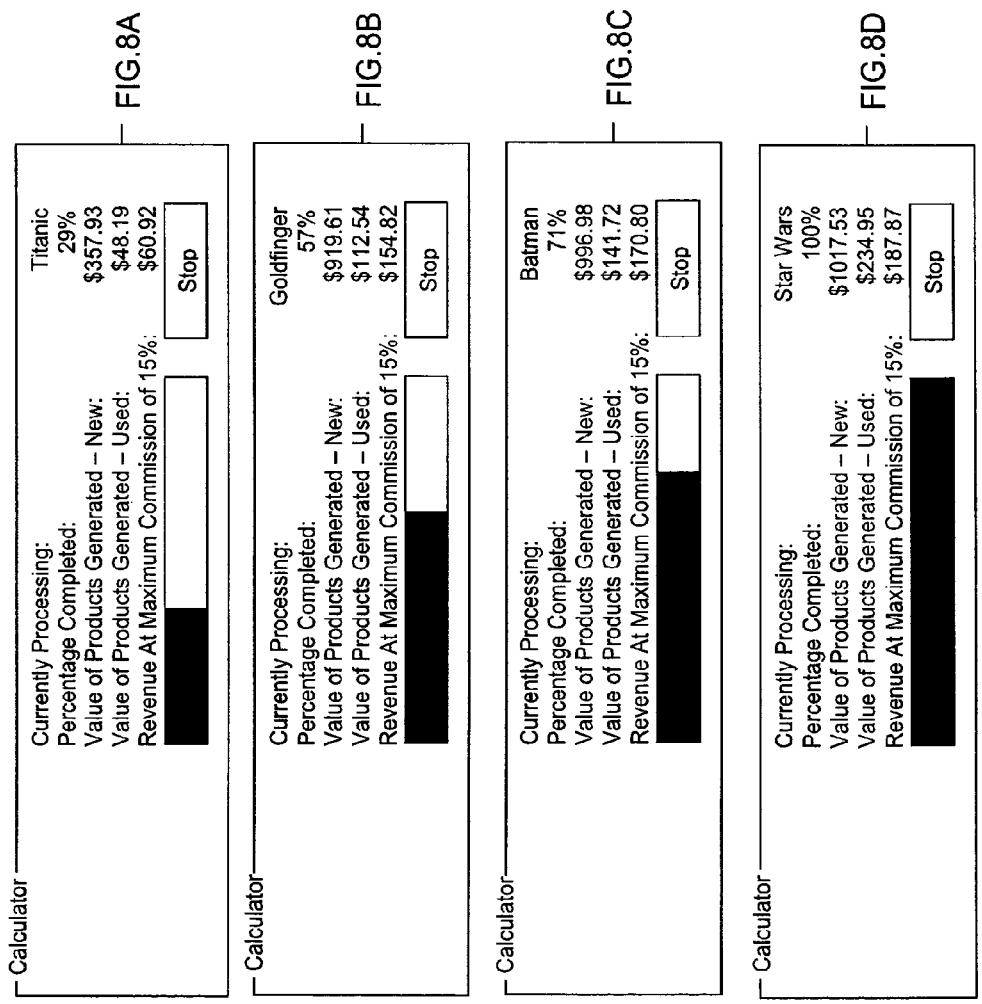

When the user clicks on the Next button in FIG. 6, the screen illustrated in FIG. 7 is displayed. This screen provides the registered affiliate with various products menus to make product category selections (Step 6).

More specifically, in the presently described implementation of the Products Generator program, the registered affiliate is provided with the ability to create up to 10 different Product Windows in an Affiliate Website. A Product Window is a window created in an Affiliate Website in which product code for an individual product is displayed. The use of 10 Product Windows is merely illustrative and is not intended to limit the scope of the invention. There is no limit to the number of Product Windows that may be made available in the Products Generator program.

In the Product Window screen shown in FIG. 7, product category selections may be made by the registered affiliate for one or more of the 10 pull-down product menus 50. For each product menu 50, a drop-down list is provided with a list of appropriate product categories. These product categories include, but are not limited to, DVD, VHS, Music, Books, Videogames, Apparel, Classical, Theatrical, Toys, Software, Magazines, Baby, PC-Hardware, Electronics, Photo, Tools, Garden, Kitchen, and Wireless.

These categories depend upon the specific vendor selected on the Switchboard Screen. The product categories can be changed at any time and the Products Generator program is designed to be updatable to accommodate changes in the Vendor Website.

In the example shown in FIG. 7, a different selection has been made for each of the ten product menus 50. Also in FIG. 7, the user has clicked on the "Use Filter" checkbox 52 to ensure the integrity of retrieved products (Step 7A).

The Filter is a software routine in the Products Generator program that compares retrieved product codes with the words of the user's keyword list and selected product categories to ensure that the retrieved products correspond thereto. A product search is performed without use of the Filter routine when the "Use Filter" checkbox 52 is unchecked by the user (Step 7B).

The Filter routine double checks retrieved product results to ensure that they relate to the original keywords. For example, assuming that a search is conducted for the keyword "Play Time" and a retrieved product code contains the description "A long time ago". When the Filter routine has been selected by clicking on the checkbox 52, this product will be deleted because it does not relate to the keyword. However, if the item description contains the term "Play Time", then the product is retained.

Once the product category selection or selections have been made in one or more of the product menus 50, the user clicks on the Generate Products button 54 in FIG. 7 to commence automatic selection of products from the target website which, in the presently described example, is AMAZON.COM (Step 8).

In the lower portion of the FIG. 7 screen, a progress calculator display 56 is provided. While the Products Generator program is conducting a search of the Vendor Website for products based on the keyword list and the selected product categories, products falling within the search categories are identified and the product codes for the identified products are retrieved. As the Products Generator program performs this process, it calculates the value of new and used products generated, the percentage complete, and the revenue generated at a maximum commission rate of 15%. This figure is for calculation purposes only. Commission rates vary from vendor to vendor. A user-defined applicable commission rate or percentage may be input into an appropriate text box provided for this purpose. The progress calculator displays this information in the progress calculator display portion 56 of FIG. 7.

FIGS. 8A-8D illustrate various progress read-outs. As shown in FIG. 8A, for the keyword entry "TITANIC", the Products Generator program searches the AMAZON.COM Vendor Website for all products. As this search progresses, the Products Generator program displays a progress report indicating the percentage completed, the value of new and used products generated, and the revenue at a maximum commission rate paid by the vendor.

FIGS. 8B-8D show similar progress reports for searches conducted for the movies "GOLDFINGER", "BATMAN" and "STAR WARS".

Figure 9:
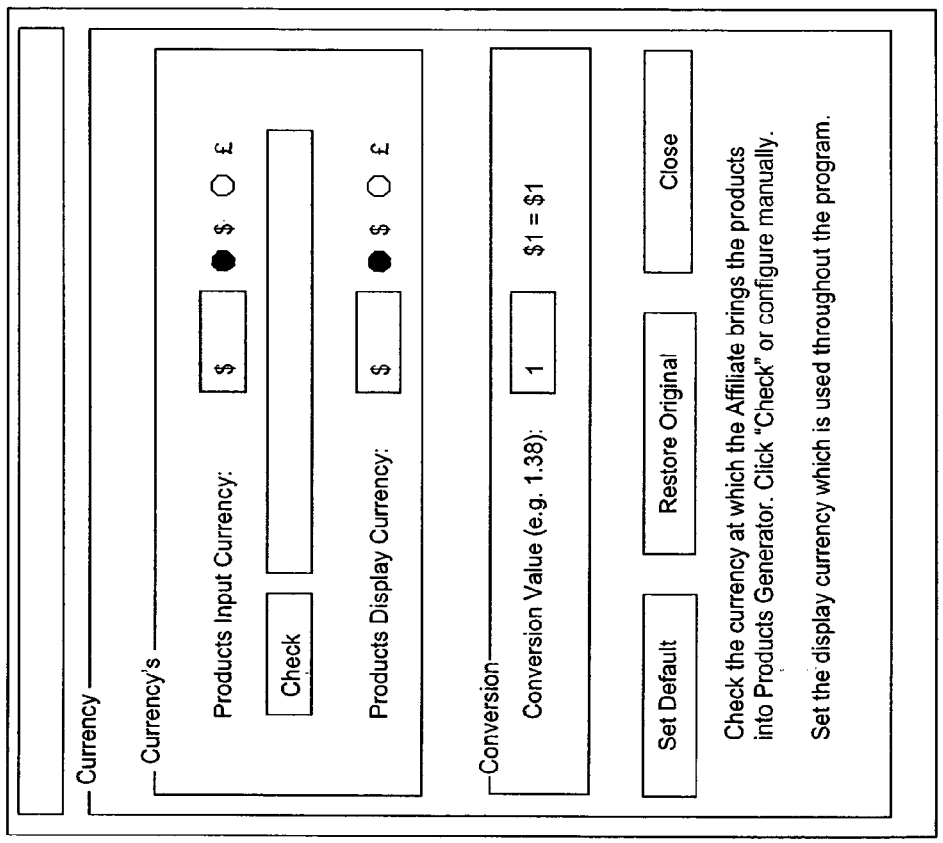

To enable use of the Products Generator program in different countries, a currency setting routine is also provided. For this purpose, the screen illustrated in FIG. 6 is provided with a Set Currency Values button 48. When this button is clicked on by the registered affiliate, a currency setting menu is displayed, as shown in FIG. 9. The currency setting menu allows the user to specify the currency type for products that are to be acquired from the Vendor Website identified in the FIG. 6 screen (Products Input Currency) and to specify the currency type for display of the products on the Affiliate Website (Products Display Currency). The currency setting menu also enables users to specify an applicable currency conversion rate. In the illustrated embodiment, the Products Generator program is capable of inputting and displaying products in U.S. dollars, British pounds, Euros, or any other currency of choice.

Clicking on the Generate Products button 54 in FIG. 7 causes the Products Generator program to commence an automatic search and selection of products from a target Vendor Website which, in the presently described example, is AMAZON.COM.

When the search is completed and all products on the Vendor Website corresponding to the keywords and product categories have been retrieved, they are displayed to the user for editing in a Control Panel (Step 9). The Control Panel provides the user with a wide variety of options for utilization of the acquired product codes in an Affiliate Website.

Operation of the Control Panel is described below in connection with reference to FIGS. 10-14.

Figure 10:
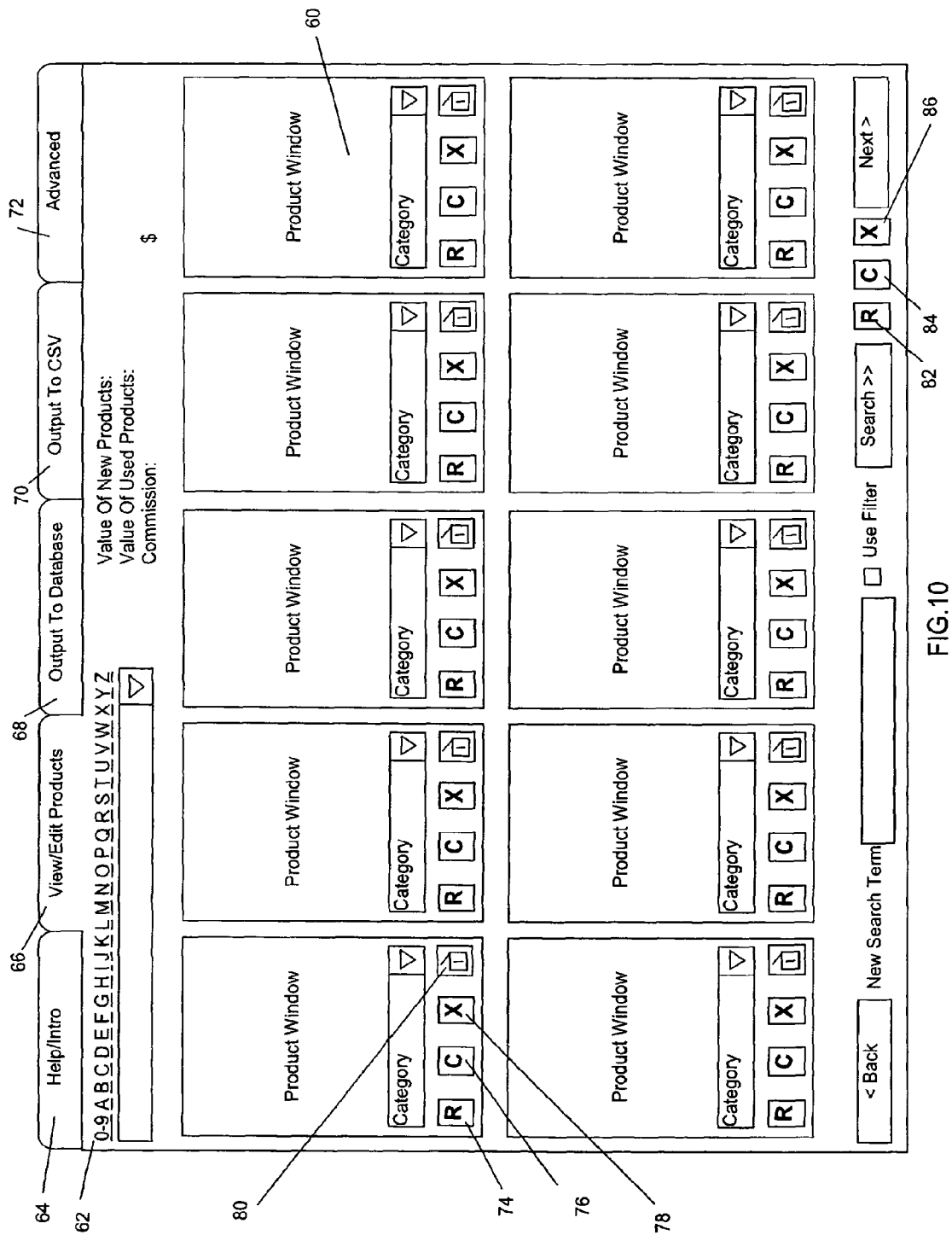

Referring first to FIG. 10, when the Products Generator program has completed its search for products identified in the keyword list, a plurality of Product Windows 60 are displayed showing the retrieved product codes, including graphic images, obtained from the Vendor Website. In particular, each Product Window 60 contains a graphic image of the acquired product, the price of the product, and a box indicating the type of the product. In the Control Panel screen, only 10 Product Windows 60 are displayed at any given time. Product Windows for additional retrieved products may be displayed by clicking on the "Next" button at the bottom of the screen, or by use of the numeric and alphabetic menu shown at the top left-hand side of the screen.

Upon activation of a number or character, the related keywords are made available via a drop-down list. When any keyword in the list is clicked on, it activates the Control Panel to display products corresponding to that selection in the Product Windows.

At the top right-hand side of the FIG. 10 screen, the value of new products and used products, along with the maximum commission payable, are displayed for the products shown in the screen.

The top of the Control Panel screen of FIG. 10 includes a set of five tabs, including Help/Intro 69, View/Edit Products 66, Output to Database 68, Output to CSV 70, and Advanced 72. Each of these tabs allows selection of a particular screen or part of the Products Generator program, as described below.

In FIG. 10, the View/Edit Products tab 66 is selected, and the Product Windows 60 are displayed along with the edit buttons "R" 74, "C" 76, "X" 78, and an Unlock/Lock symbol 80 in the form of an icon resembling a padlock (Step 10). The edit buttons 74-78 provided within each individual Product Window are used to edit the product in that respective Product Window (Step 11). In addition, similar edit buttons are provided at the bottom of the screen to perform a global edit on all Product Windows displayed on the screen (Step 12). The edit buttons allow the user to select various options, as follows:

"R"—Refresh this Product Window (Steps 11A, 12A).

Selection of this option clears the corresponding product and shows other products that have just been searched for and retrieved live from the Vendor Website that may be selected from. More specifically, selection of this option will clear the current product and open a new Refresh Window with other products that have been searched for and retrieved "live" and that can be selected from. When the user clicks on Select on a displayed product, the selected product will replace the previous one in the source Product Window. It could also replace another product in another Product Window in the Control Panel that has been selected from the drop-down list in the current Refresh Window. If the user wishes to select all of the new products retrieved from the vendor's website in the current Refresh Window a Select All function is available. Select All will take all of the products in the Refresh Window and will populate the Control Panel Product Windows with all of the products, thereby replacing all the current products. Exceptions to this are any Product Windows that use the Lock feature.

When any Product Window is 'locked' no new products may be allowed to replace the current 'locked' product in that Product Window. The user might wish to choose this option to locate a product with a higher price so that a greater commission would be payable on a sale.

"C"—Clear this Product Window of Current Product (Steps 11B, 12B).

Selection of this option leaves the Product Window open for new product searches and entries. In other words, selection of this option deletes the current product from the selected Product Window and leaves it open for new products if the user runs a new product search or selects "R" (Refresh) again.

"X"—Disable this Product Window from Future Product Entries and Delete the Current Product (Steps 11C, 12C).

The padlock icon is displayed in the form of an unlocked/locked padlock to provide a lock/unlock function (Step 11D). If the padlock open symbol is displayed, the user has allowed new products to be entered into that Product Window from any and all searches. If the padlock symbol is closed or locked the current product is locked into the current Product Window and therefore not subject to change without the lock being de-activated.

Users can manually clear or update individual products with this unique Products Generator Control Panel specifically designed to edit the products which have been retrieved from vendor's web sites.

Figure 11:
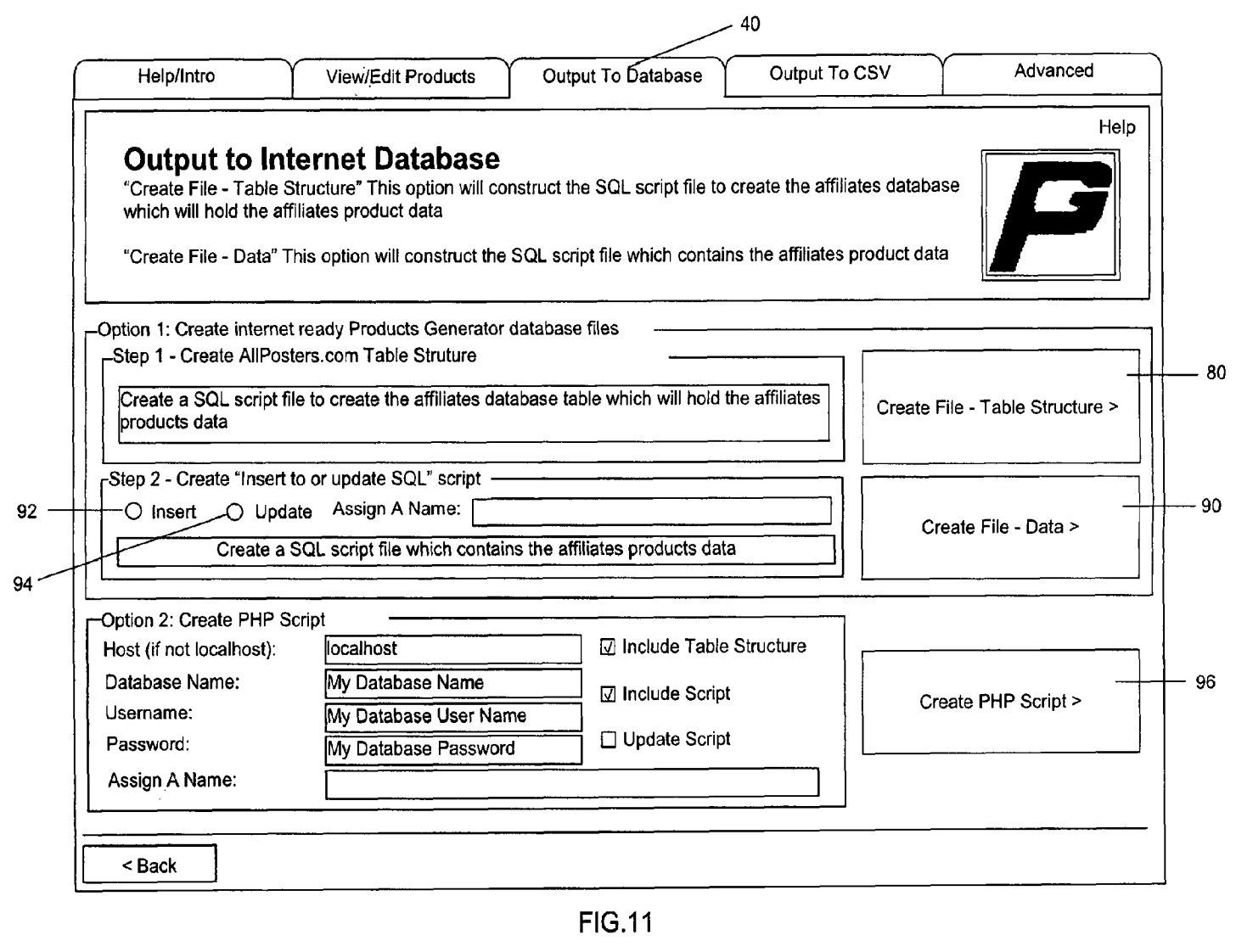

FIG. 11 is the Refresh Window that appears when the user clicks on "R" (refresh) 74 or 82 in the Control Panel screen of FIG. 10. When the user clicks on "Select" on a displayed product, the selected product will replace the previous one in the source Product Window. It could also replace another product in another Product Window in the Control Panel that has been selected from the drop-down list in the current Refresh Window. If the user wishes to select all of the new products retrieved from the vendor's website in the current Refresh Window a "Select All" function is available. "Select All" will take all of the products in the Refresh Window and will populate the Control Panel Product Windows with all of the products, thereby replacing all the current products. Exceptions to this are any Product Windows that use the "Lock" feature. When any Product Window is locked, no new products may be allowed to replace the current locked product in that Product Window.

Figure 12:
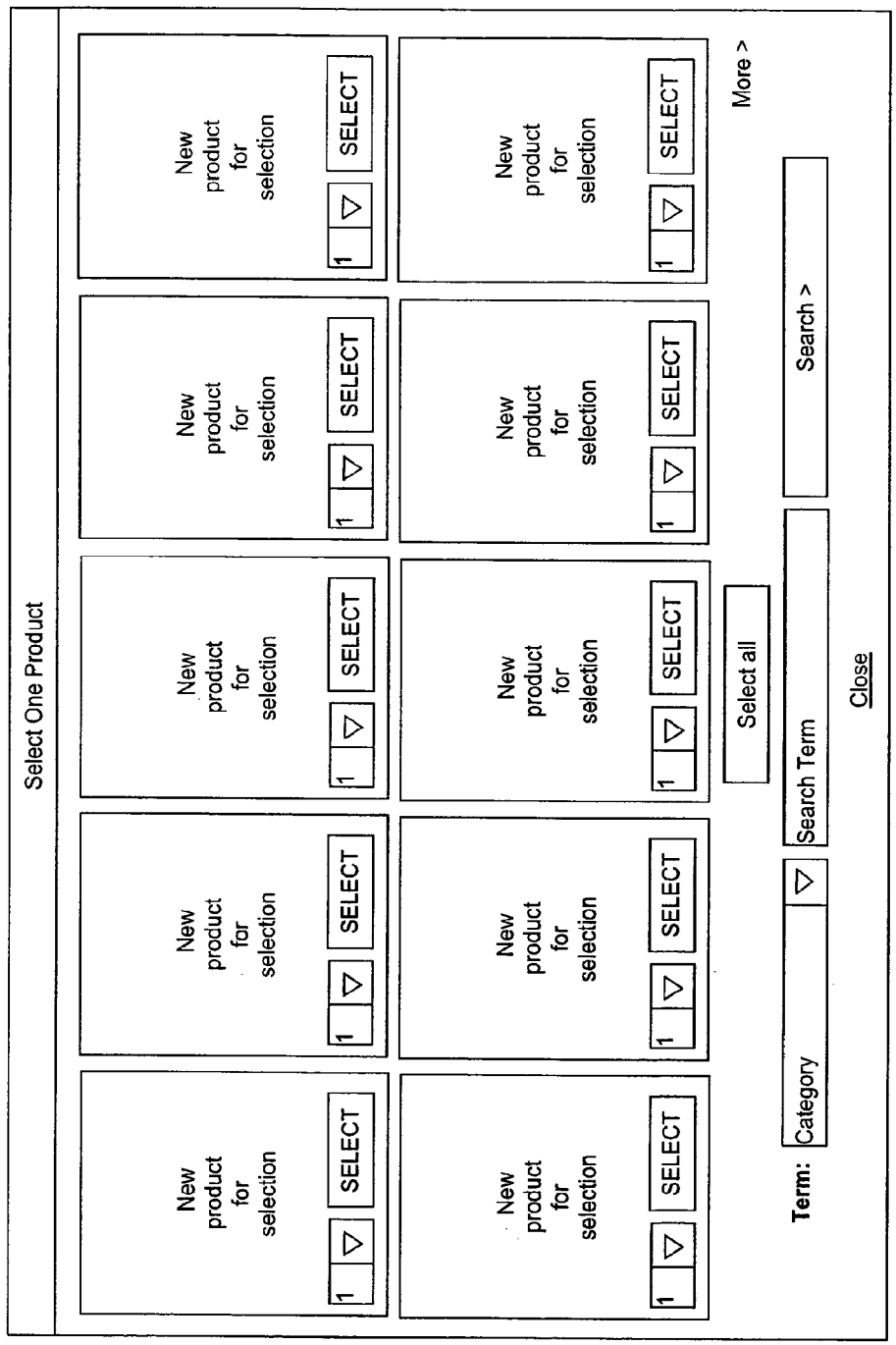
Figure 13:
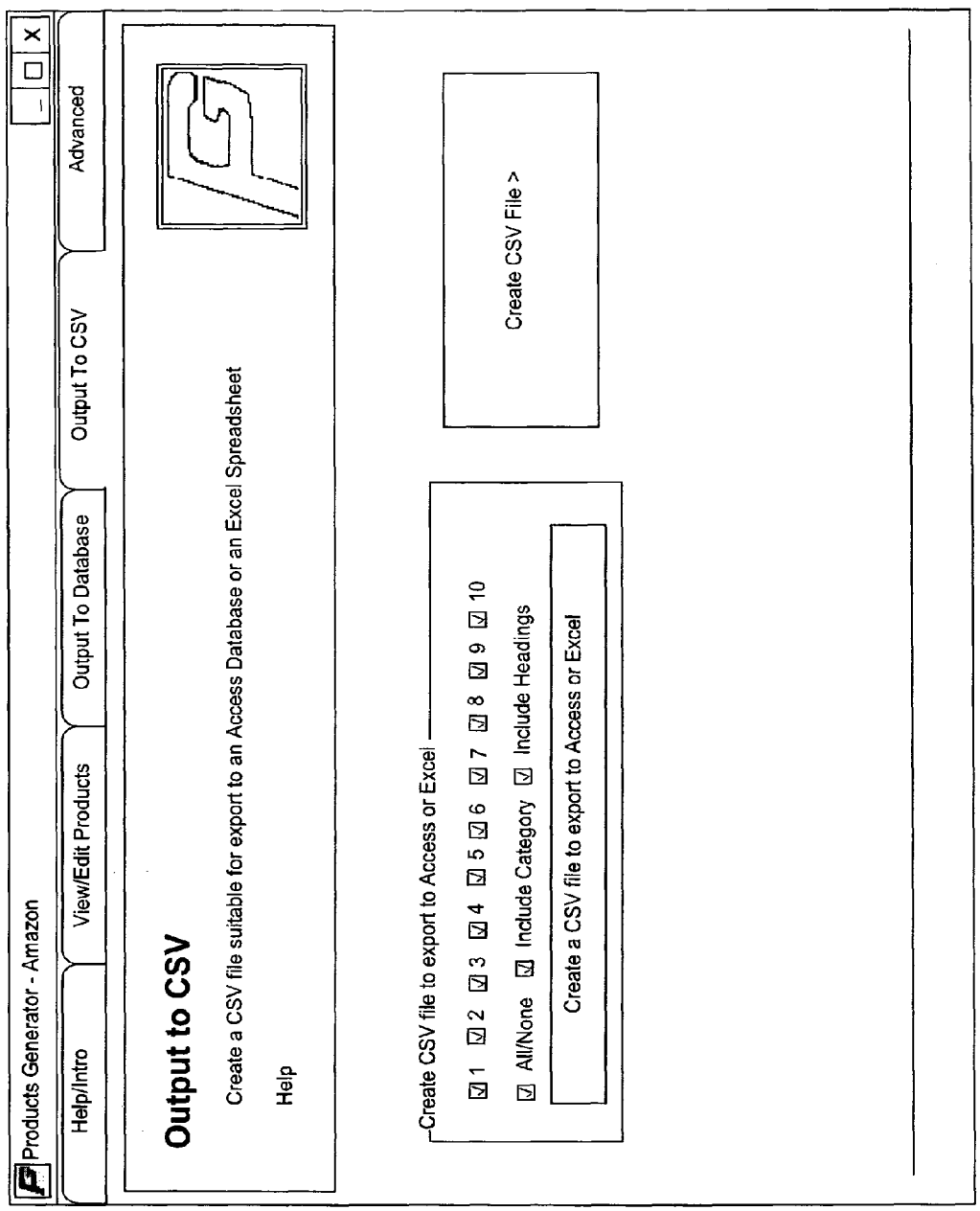

Referring now to FIG. 12, the "Output to Database" tab 68 has been selected (Step 13). Output of the retrieved product codes to an internet database is illustrated in FIG. 11. The Products Generator program provides for two separate output options to enable the Products Generator database to run on the user's website. In the first option, a SQL table structure is created by clicking on the Create File—Table Structure button 88 in FIG. 11 (Step 14). Then, an "Insert to SQL" script is created and the Create File—Data button 90 is clicked on. The first time a database is constructed or data is input thereto, the user must select the "Insert" check box 92 prior to clicking on the Create File—Data button 90. If the user is updating an existing database, the "Update" check box 94 is selected prior to clicking on the Create File—Data button 90.

Once the database files are produced, they may be run on the client computer or uploaded for the script to run on a server hosting the Affiliate Website (Step 15). Once the script is run, the table is constructed and the product data is inserted therein.

In the section option "Create PHP Script", the user creates a PHP script, if supported by the web hosting company that serves the Affiliate Website (Step 16). The hosting company and database details are entered in the appropriate text boxes shown in the lower left-hand side of the screen and the registered affiliate then clicks on a Create PHP Script button 96, which results in generation of a file that is then uploaded to the server and executed (Step 17).

The Products Generator program also provides an FTP facility which will upload the files to the Affiliate Website ready for use, thereby eliminating the need for any third-party FTP program or similar upload utility.

Selection of either of the above-described options for outputting the product codes to an internet database results in the data being available for serving alongside the Affiliate Website (Step 18). Referring now to FIG. 12, the "Output to CSV" tab in FIG. 10 has been selected (Step 19). This screen allows the user to create a CSV file containing relevant data. A CSV file is a universally importable, comma-delimited text file which can be imported into any compatible program such as but not limited to Microsoft Word, Microsoft Access, and/or Microsoft Excel. The screen shown in FIG. 13 allows the user to select all or none of the ten product windows (Step 20), or to select individual products by clicking on any of ten check boxes (Step 21). The user may also select whether the CSV file to be created should include or exclude (Steps 22A, 22B) the product category and headings (Steps 23A, 23B). When the user has made the desired selections, a "Create CSV File" button is selected by the user (Step 24).

Figure 14:
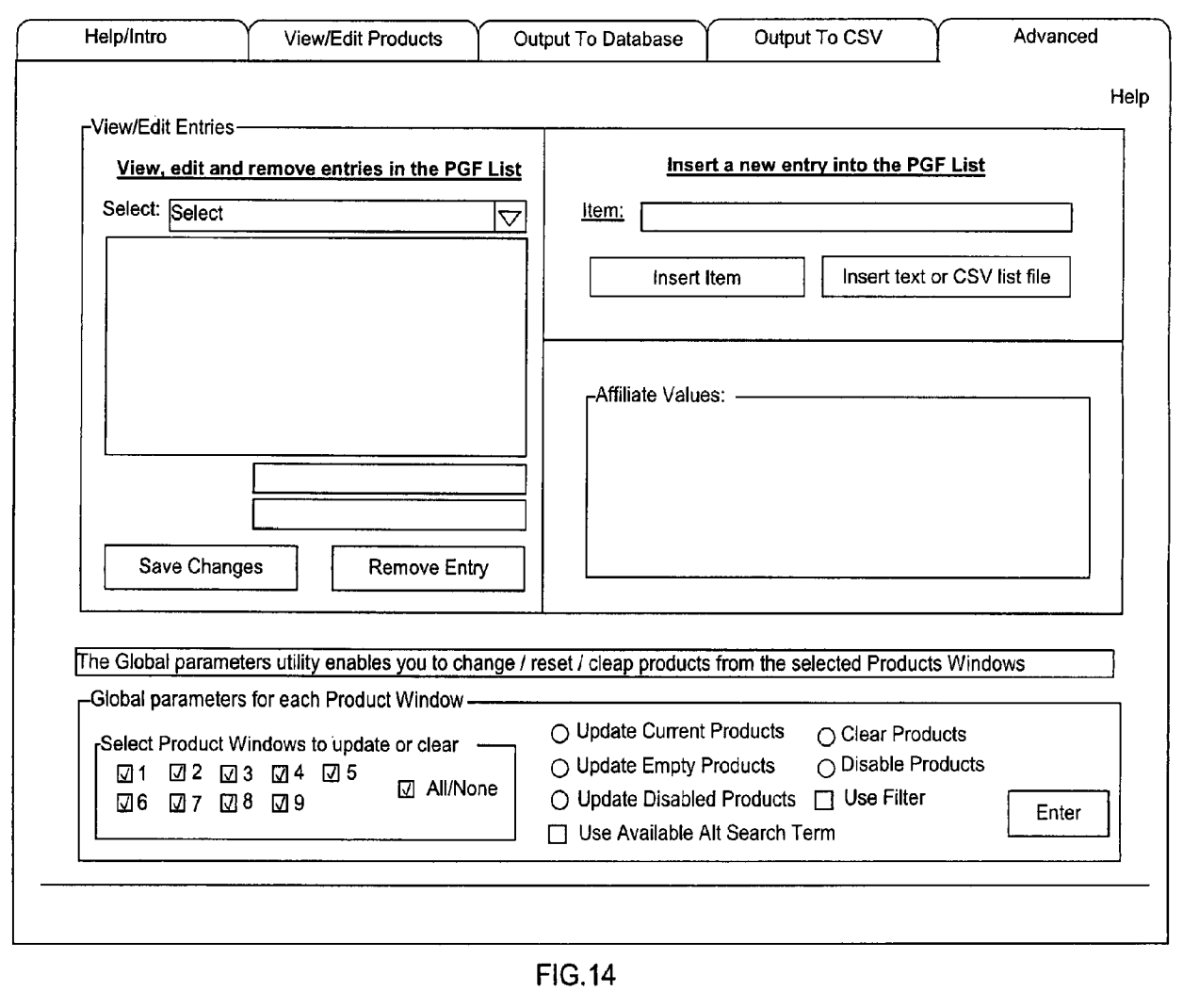

When the Advanced tab 72 in the Control Panel shown in FIG. 10 has been selected (Step 25), the screen shown in FIG. 14 is displayed. This screen allows the user to perform various edit features on a global basis.

For instance, the user may view, edit, or remove keywords in the keyword list (Step 26). Thus, the Advanced screen is used for viewing and editing, e.g., adding, deleting or updating existing keywords in the PGF Keyword List file after the a product search and retrieval exercise has already been performed. Items or keywords can be inserted singly (Step 27) or imported from, for instance, a list or CSV file (Step 28).

In addition, when a user selects a given keyword, the Advanced screen can display how many products are assigned to the selected keyword, the value of products retrieved for that keyword, and the commission value of all the products retrieved for that keyword.

The user can also globally update and/or validate all the products in the PGF file. This function allows the user to globally throughout the entire keyword list set the Product Window categories for each and every keyword (Step 29). Alternately, the user can either update and/or validate each and every product in the Products Database (Steps 30, 31), update any disabled (Step 32) or empty (Step 33) product entries and using the filter or alternative search term update and validate all products. This global option can be set so that each individual Product Window or a plurality of Product Windows can be updated and or validated.

It should be noted that the Control Panel described above and illustrated in FIGS. 10-14 operates while the Products Generator program is being executed on the client computer. As will be described in greater detail below, the Products Generator program also creates a "live" Control Panel which enables the identical operations described above in connection with the Control Panel to be performed by a registered affiliate directly from the Affiliate Website. The Products Generator program does this by inserting software into the Affiliate Website to enable the above-described operations to be performed directly from the Affiliate.

Thus, the "live" Control Panel differs from the Products Generator program Control Panel in that the "live" Control Panel runs in a browser, i.e. Internet Explorer, Netscape Navigator, or the like, and is used to edit the live data that is currently being served along with the Affiliate Website, i.e., the Products Database which is being used for the Affiliate Website.

Therefore, it follows that if the "live" Products Database is being edited, this will result in the changes being reflected live on the Affiliate Website.

Contrastingly, the Products Generator program Control Panel works within the Products Generator program and edits a static PGF file on the computer. This file is static. If it is altered, then only this file is changed and only the program operator can view the altered data.

Manual Product Entry

In addition to the fully automated method of searching for and acquiring product codes described above, the Products Generator program provides a manual input method for acquiring product codes. There are various instances where a registered affiliate may encounter a product of interest and want to acquire the code for such product without going through the above-described process. Thus, the Products Generator program provides a manual Product Grabber routine that enables manual product code acquisition. The Product Grabber routine allows a registered affiliate to acquire product codes for any product from any website, so long as the product itself originates from a participating Vendor Website (in this case, AMAZON.COM, ALLPOSTERS.COM, E-MERCHANDISE.COM, and ART.COM).

Figure 15A:
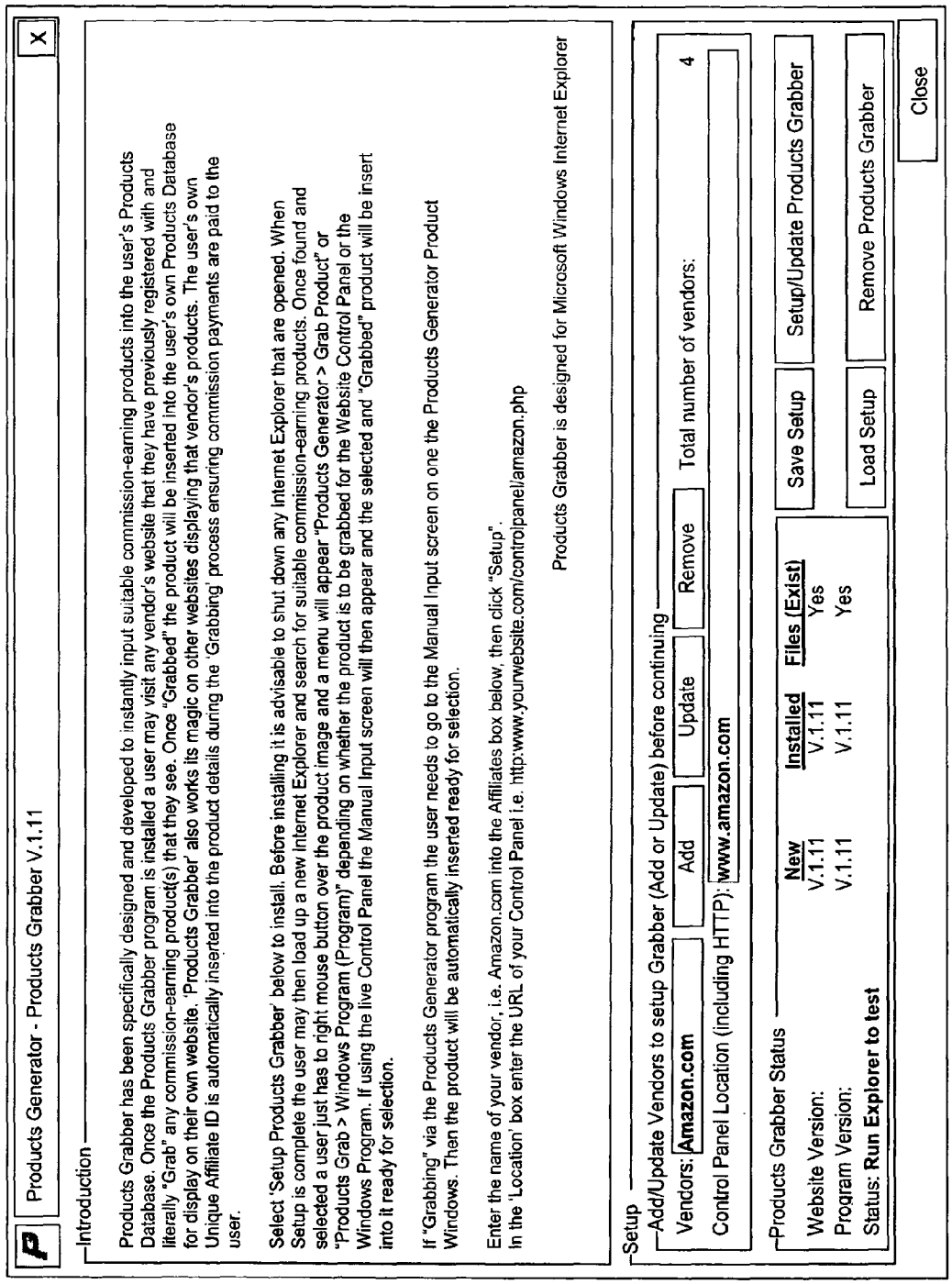
FIGS. 15A-15C are images displayed on a computer monitor during execution of the manual and semi-manual "Products Grabber" application of the Products Generator computer program.
Figure 15B:
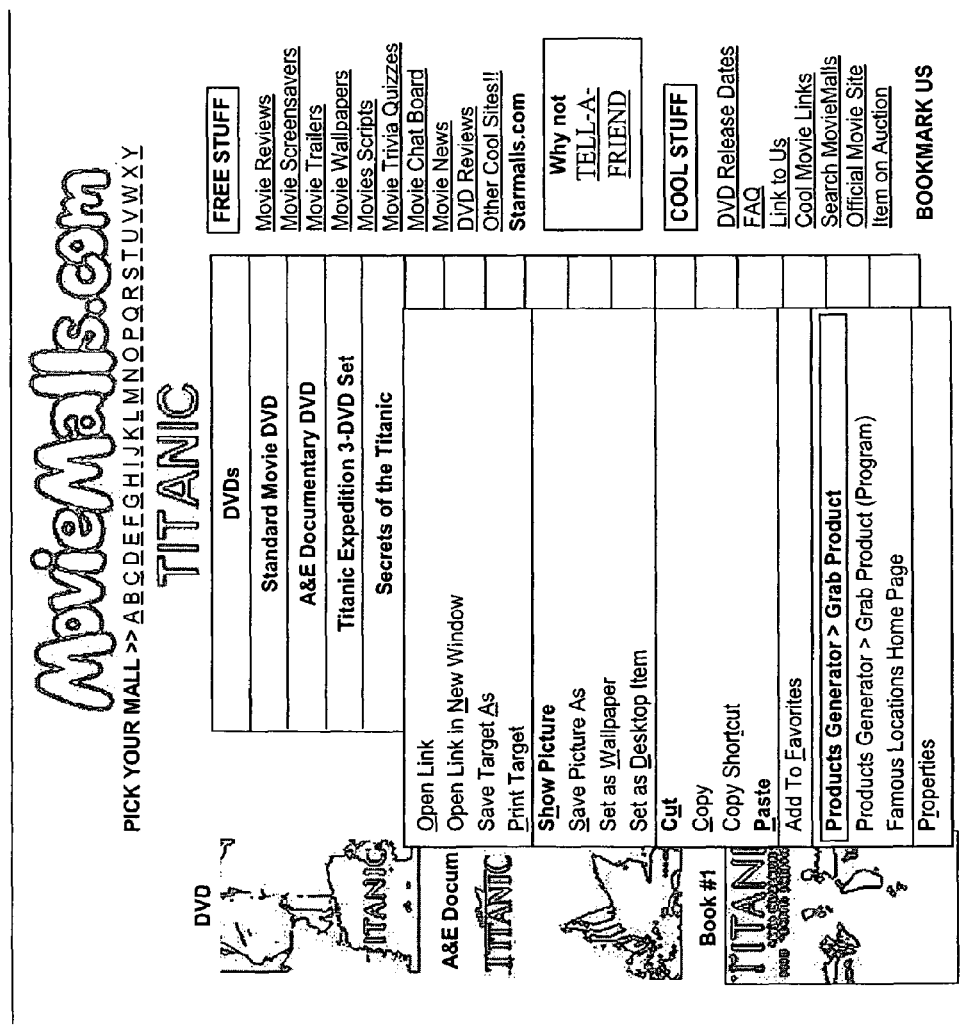
Figure 15C:

The Product Grabber routine is illustrated in FIGS. 15A-15C. FIG. 15A is a setup screen that is displayed when the Product Grabber software routine is setup upon selection of the Setup Products Grabber button 16 in the Switchboard screen shown in FIG. 2. To set up Products Grabber, the registered affiliate is prompted to identify one or more Vendor Websites and load a given setup.

After setting up Products Grabber, the registered affiliate may import any products of interest from the identified Vendor Websites. As shown in FIG. 15B, when the registered affiliate encounters a product of interest while viewing any website, right-clicking on the computer mouse while the mouse pointer is located on the product causes a menu to be displayed on the monitor. The menu is similar to that generated by the Windows operating system in response to right-clicking on the mouse. However, the menu includes additional options entitled "Products Generator—Grab Product" and "Products Generator—Grab Product (Program)" that allow the registered affiliate to "grab" the product code for the desired product. The former option is a "live" version of Products Grabber that results in updating of the Affiliate Website. The latter version is used when the Products Generator software is being executed and does not result in automatic updating of the Affiliate Website.

More specifically, once loaded on the computer of the Registered Affiliate, various Products Generator resources remain active and can be run at any time. These include the Products Grabber and manual input resources and the Control Panel, as described above. The "Grab Product" option can be selected by the user at any time the Products Generator program is running in the background. The "Grab Product—(Program)" option is selected by the user while the Products Generator program is actively running, such as during its first use.

When the registered affiliate selects one of the "Grab Product" options, the Manual Input screen shown in FIG. 15C is displayed on the monitor. The Manual Input screen contains various text boxes in which identifying data relating to the product code acquired from the Vendor Website are displayed, such as the link to the product and a description of the product. Thereupon, the product code is ready for specific Product Window selection and assignment.

While the Manual Input screen is automatically filled in by the Products Grabber routine, the Manual Input screen also enables manual input of a specific product's details. The Products Generator program provides a search facility within the Manual Input screen that enables a user to search for a specific product via the URL or vendor's product ID. Once the detail has been entered, it then retrieves all the product info.

In addition to inputting products manually, a user can also manually edit existing products via the same method.

(2) Website Database Wizard

Figure 16:
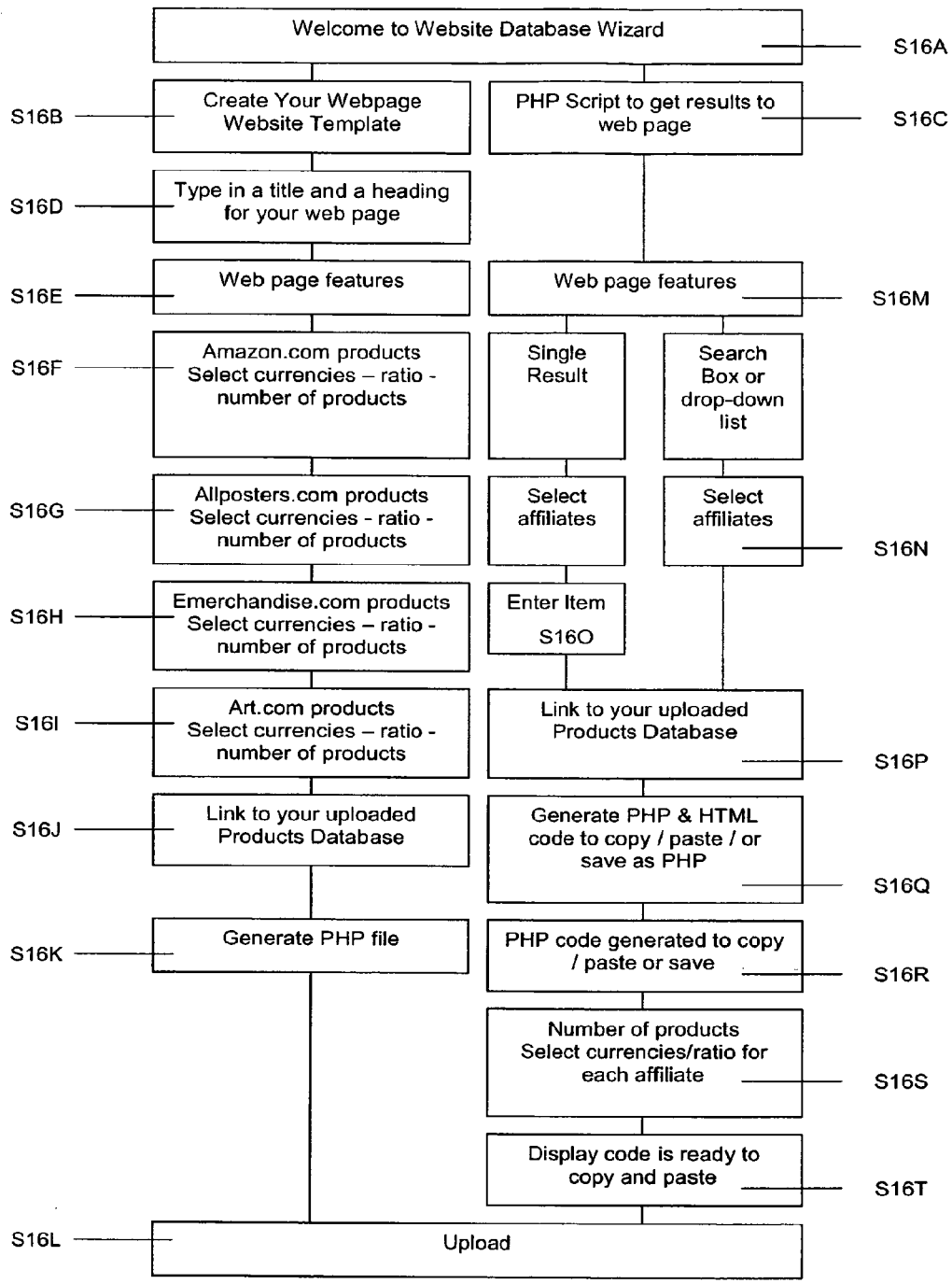

As pointed out above, when the user selects the Website Database Wizard button 14 in the Switchboard screen shown in FIG. 2, the Website Database Wizard is launched. FIG. 16 is a flowchart of the Website Database Wizard and FIGS. 17-30 are screen images of the various screens generated by the Website Database Wizard. When the Database Wizard is initially launched (Step 16A), the Welcome Screen shown in FIG. 17 is displayed to inform users that the Website Database Wizard enables users to create a single or multiple web pages in a few short steps complete with all the code needed to display retrieved products stored in the Products Database created by the Products Generator program.

Figure 17:
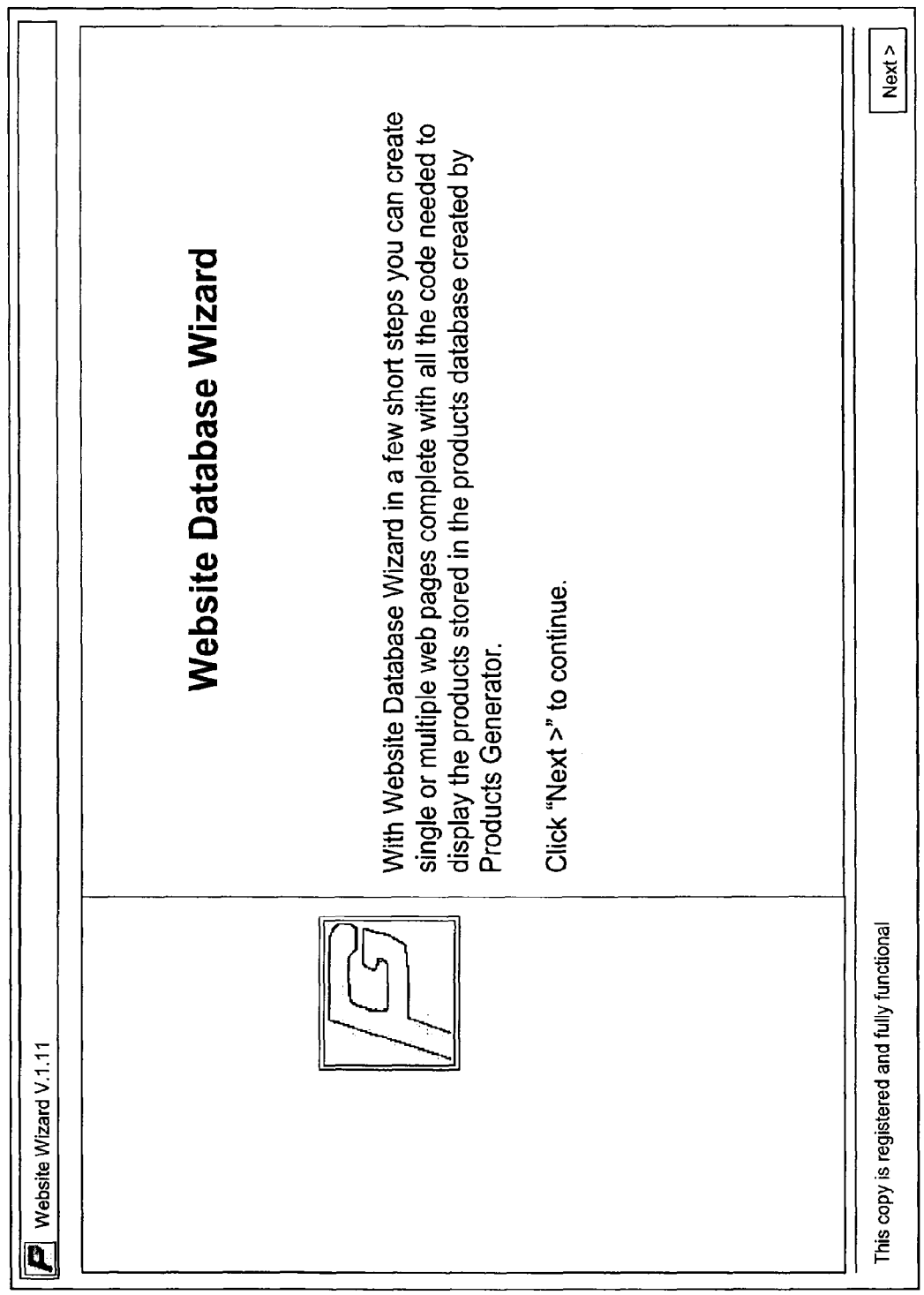
Figure 18:
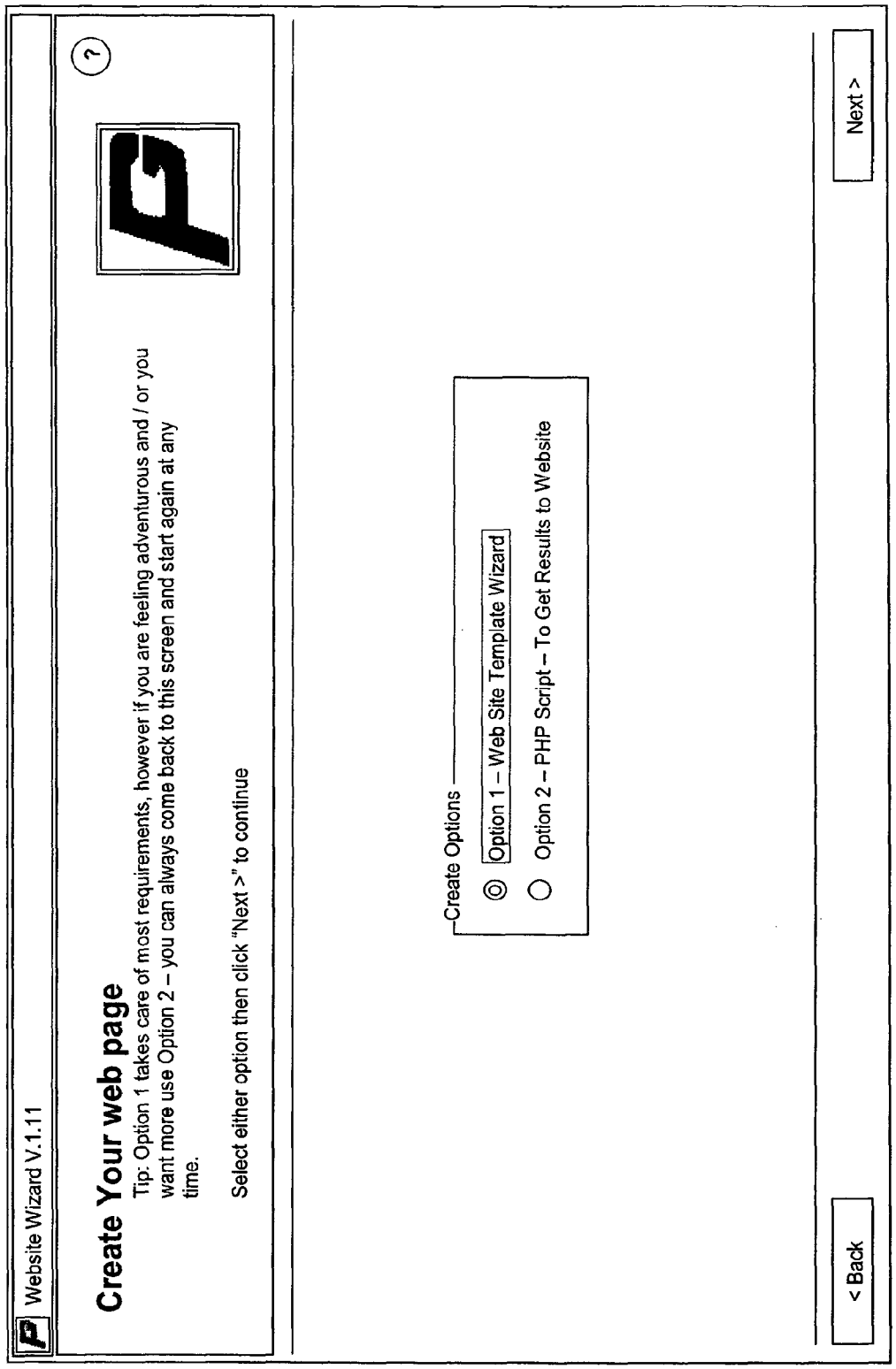

When the user clicks on the Next box in FIG. 17, the Option Screen shown in FIG. 18 is displayed. The Option Screen provides users with two options for the creation of an Affiliate Website. Option 1 launches a standard Website Template Wizard which creates customized web pages complete with all the code necessary to display the retrieved products on the user's website (Step 16B). Option 2 launches a routine that creates PHP Scripts to be used within an existing Affiliate Website to display products (Step 16C).

Selection of Option 1 commences an automated process of creating an Affiliate Website with all the necessary coding to display retrieved products. Although selection of Option 1 will automatically create an Affiliate Website with a pre-prepared template design, it does allow the user to select several feature options, as described below.

Figure 19:
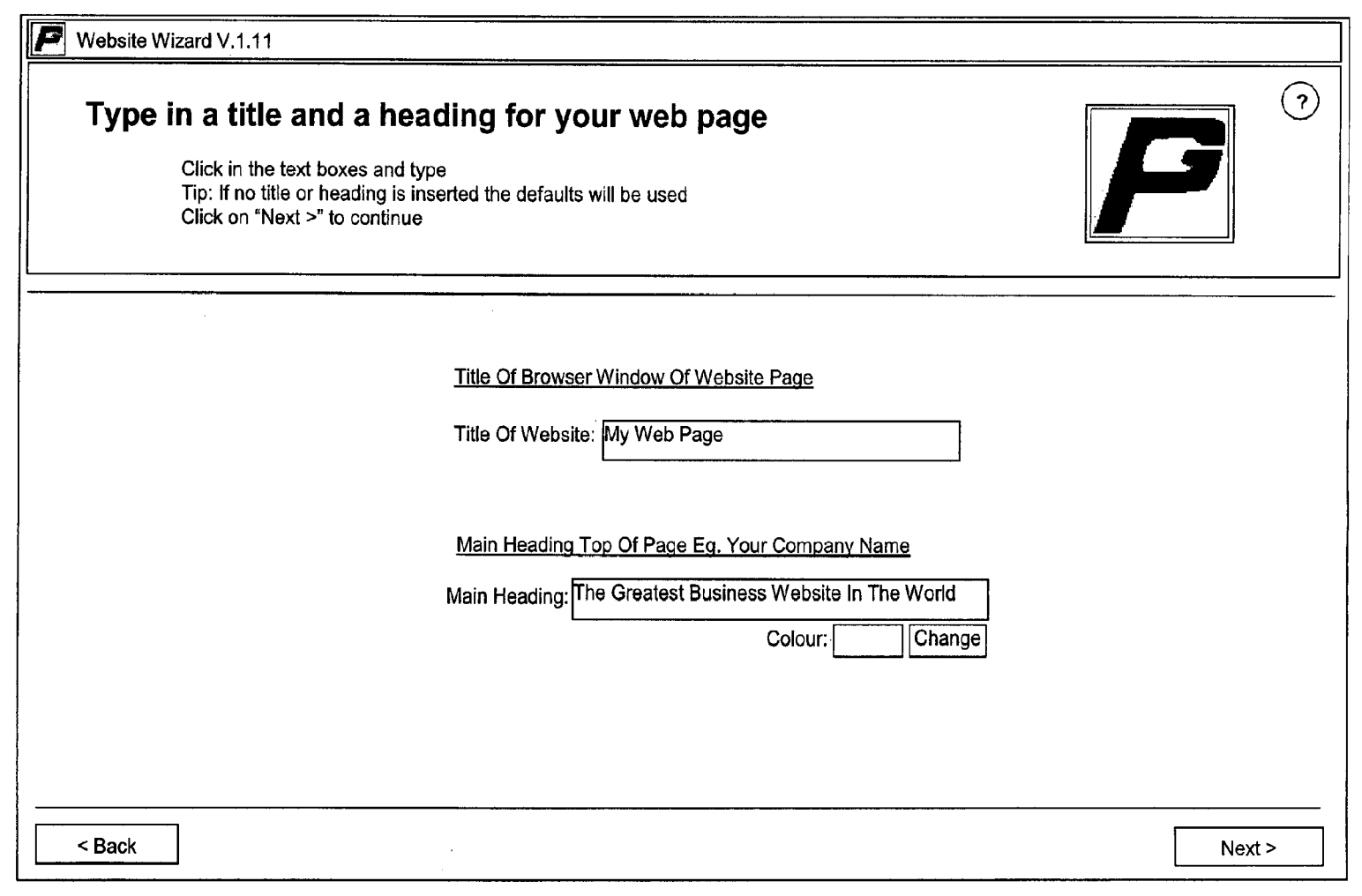

When the user has selected Option 1 and clicked on the Next box in FIG. 18, the screen shown in FIG. 19 is displayed. This screen prompts the user to enter into text boxes the title of the web page to be created and the main heading to be inserted at the top of the web page (Step 16D). In FIG. 19, the user has entered "My Web Page" as the title in the appropriate text box and "The Greatest Business in The World" as the main heading in the appropriate text box. The user has also selected black as the color of the main heading text.

When the user has clicked on the Next box in FIG. 19, the "Web Page Features" screen shown in FIG. 20 is displayed (Step 16E). This screen prompts the user to select the number of columns (1-3) of the web page to be generated by clicking on the appropriate checkbox and allows the user to specify whether or not a search box and a drop down list are to be included in the Affiliate Website. Thus, selection of Option 1 provides the user with several multi-choice options for the features of the Affiliate Website.

When the user clicks on the Next box in FIG. 20, the screen shown in FIG. 21 is displayed (Step 16F). In this screen, the user is prompted to click on a checkbox to indicate whether or not products retrieved from a particular Vendor Website are to be included in the Affiliate Website. In addition, the user is also prompted to indicate the number of products that are to appear in each column of the Affiliate Website, as well as the currency type products input from the Vendor Website, the currency type of products to be displayed on the Affiliate Website, and an appropriate conversion rate. The screen illustrated in FIG. 21 assumes that the user has previously selected "three" columns in the FIG. 20 screen. In addition, the screen shown in FIG. 21 is specific to the AMAZON.COM Vendor Website. However, if the user has conducted searches of other Vendor Websites, additional screens similar to that in FIG. 21 will successively appear when the user clicks on the next button in FIG. 20 (Steps 16G, 16H and 16I).

In the screen shown in FIG. 22, the user is prompted to enter information needed to access the products data stored in the Products Database on the Affiliate Website (Step 16J). As can be seen, this information includes Host, Database Name, Username and Password. The user then selects the Generate button to generate the PHP script. (Step 16K).

By selecting Option 1 and following the instructions contained in the screens illustrated in FIGS. 18-22 and steps 16B through 16K, the Products Generator program produces a pre-defined template to enable a user to supply information to link to their uploaded Products Database (Step 16L).

Figure 23:
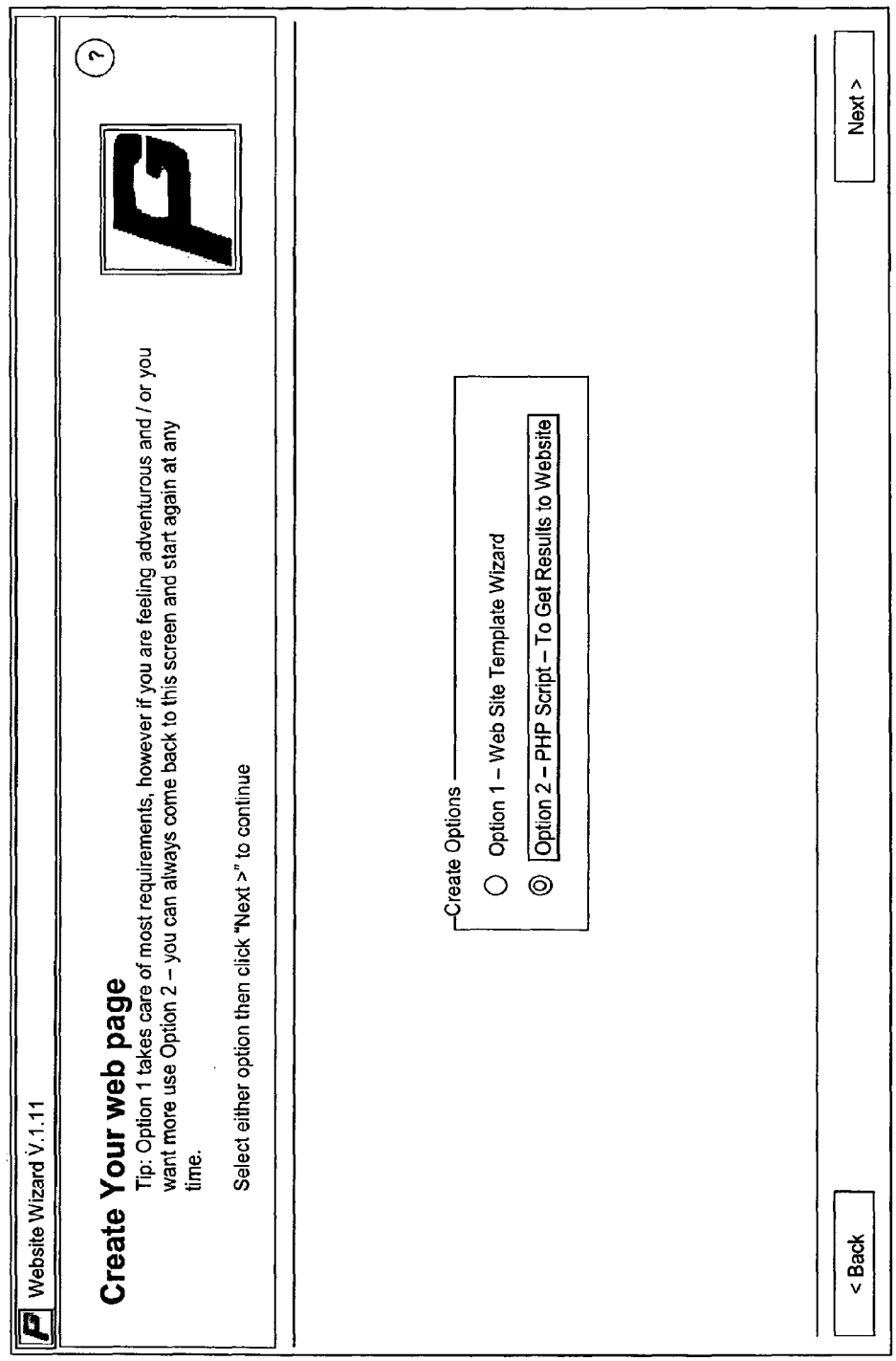
Figure 24:
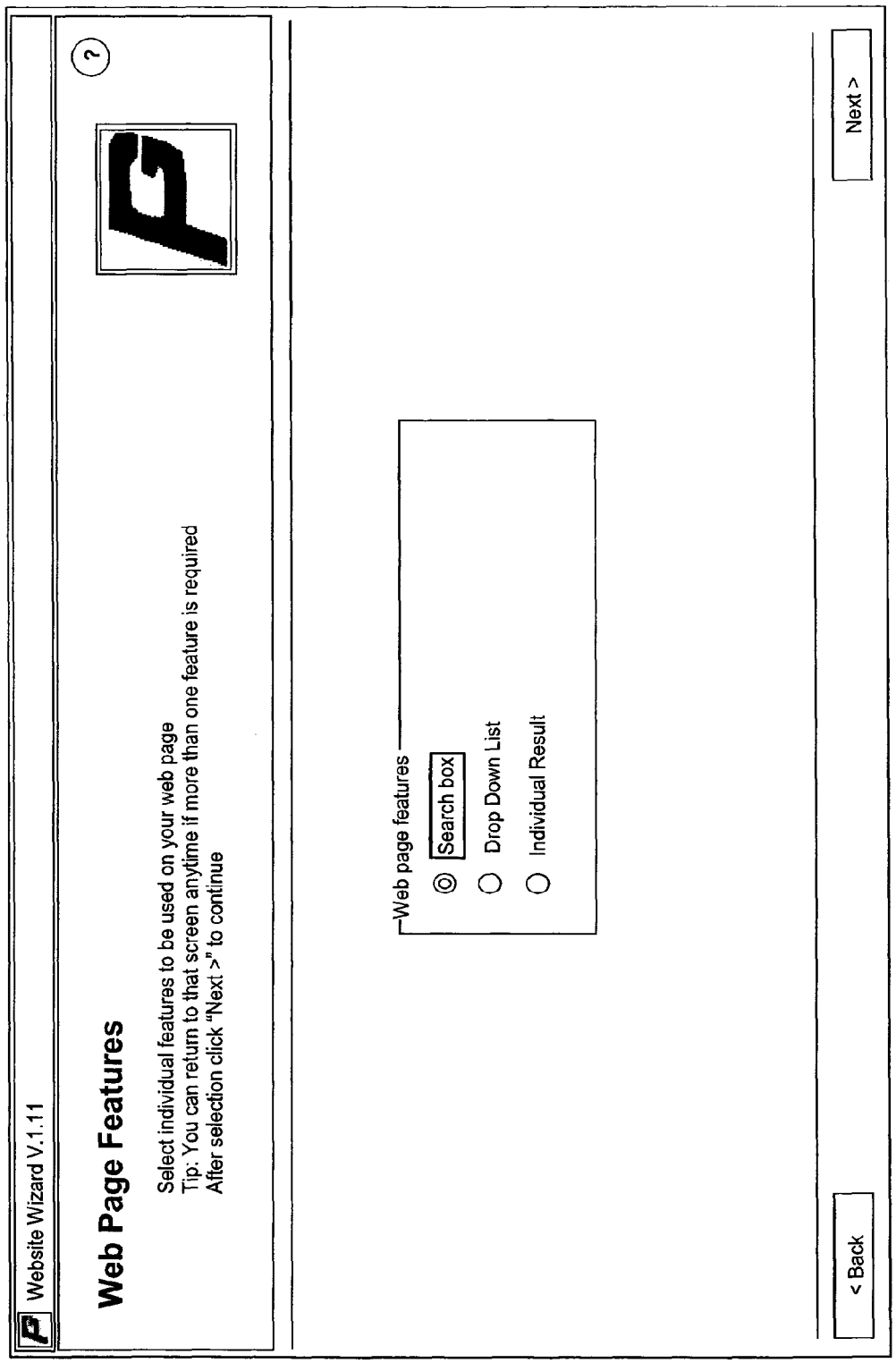

FIG. 23 illustrates a screen generated by the Products Generator program when the user has selected Option 2 in FIG. 18. This option gives the user greater control over the appearance of the Affiliate Website. When Option 2 is selected, the "Web Page Features" screen shown in FIG. 24 is displayed (Step 16M). In this screen, the user is prompted to select individual features for the Affiliate Website, including a Search Box, a Drop Down List, and an Individual Result.

When the user clicks on the Next box in FIG. 24, the screen shown in FIG. 25 is displayed, which prompts the user to select Vendor Websites from which products are to be displayed on the Affiliate Website (Step 16N).

Figure 26:
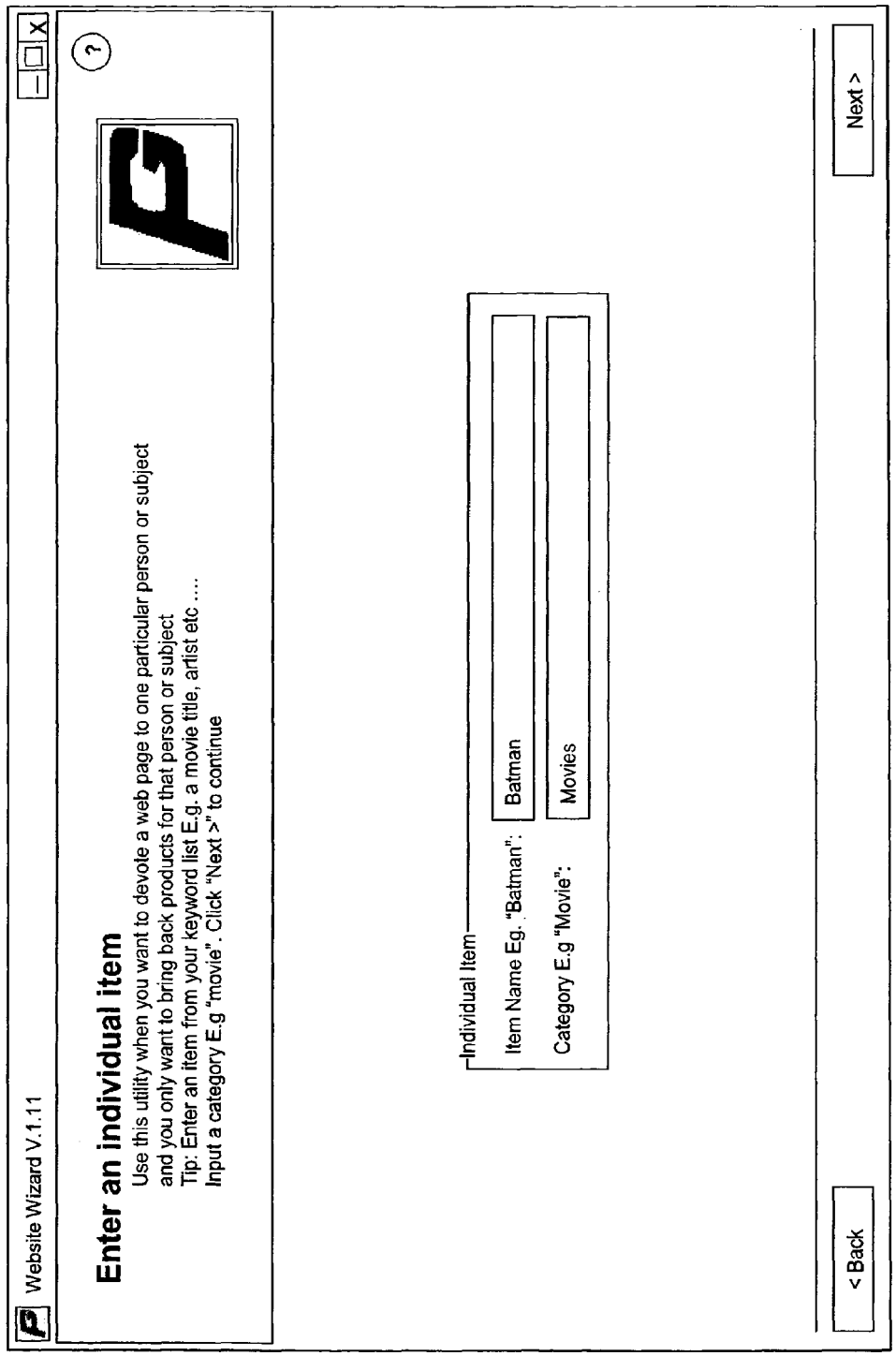

When the user has selected the "individual result" in FIG. 24, the screen shown in FIG. 26 is displayed (Step 16O). This screen allows the user to devote an Affiliate Website or a single Affiliate web page to one particular person or subject and to include products relating only to that person or subject. In the illustrated example, the user has entered Batman as the Individual Value and movies as the product category.

When the user has clicked on the next box in FIG. 26, the screen shown in FIG. 27 is displayed (Step 16P). This screen prompts the user to enter information needed to link to the uploaded Products Database, including Host, Database Name, Username and Password.

When the user clicks on the Generate button in FIG. 27, the Website Database Wizard generates the HTML/PHP code, as shown in FIG. 28 (Step 16Q). Under Option 1, the user must copy the HTML/PHP code and paste into the Affiliate web page. Under Option 2, the user must save the code as a PHP file to upload to the server of the Affiliate Website. If the user has saved the code as a PHP file, it can be uploaded separately and used below the <body> tag to access it.

Figure 29:
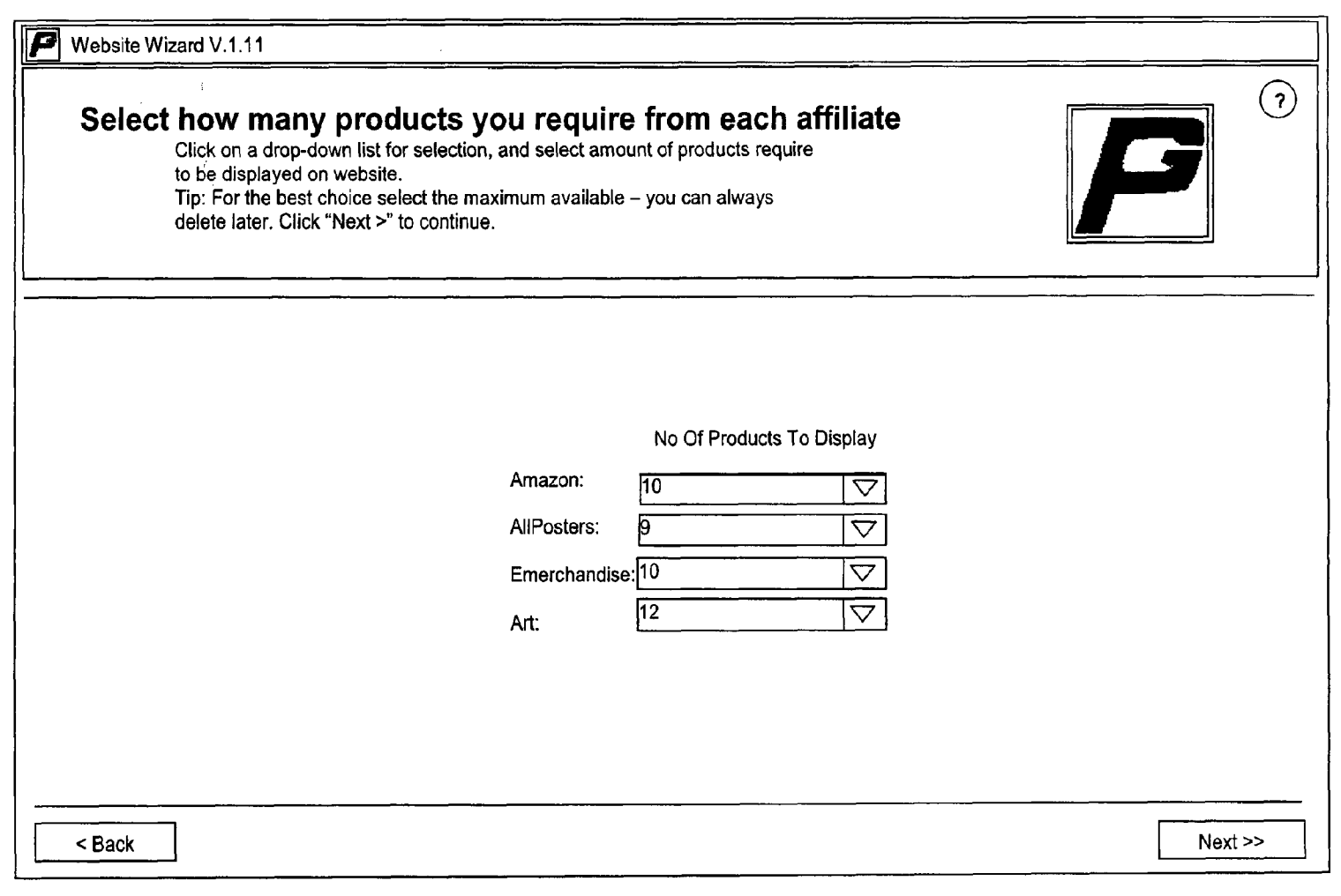

Then, as shown in FIG. 29, after the code has been generated by the Products Generator program in Step 16R, there are options available to the user. For instance, the user may select the number of products required from each Vendor Website by clicking on a drop-down list for selection (Step 16S).

Figure 30:
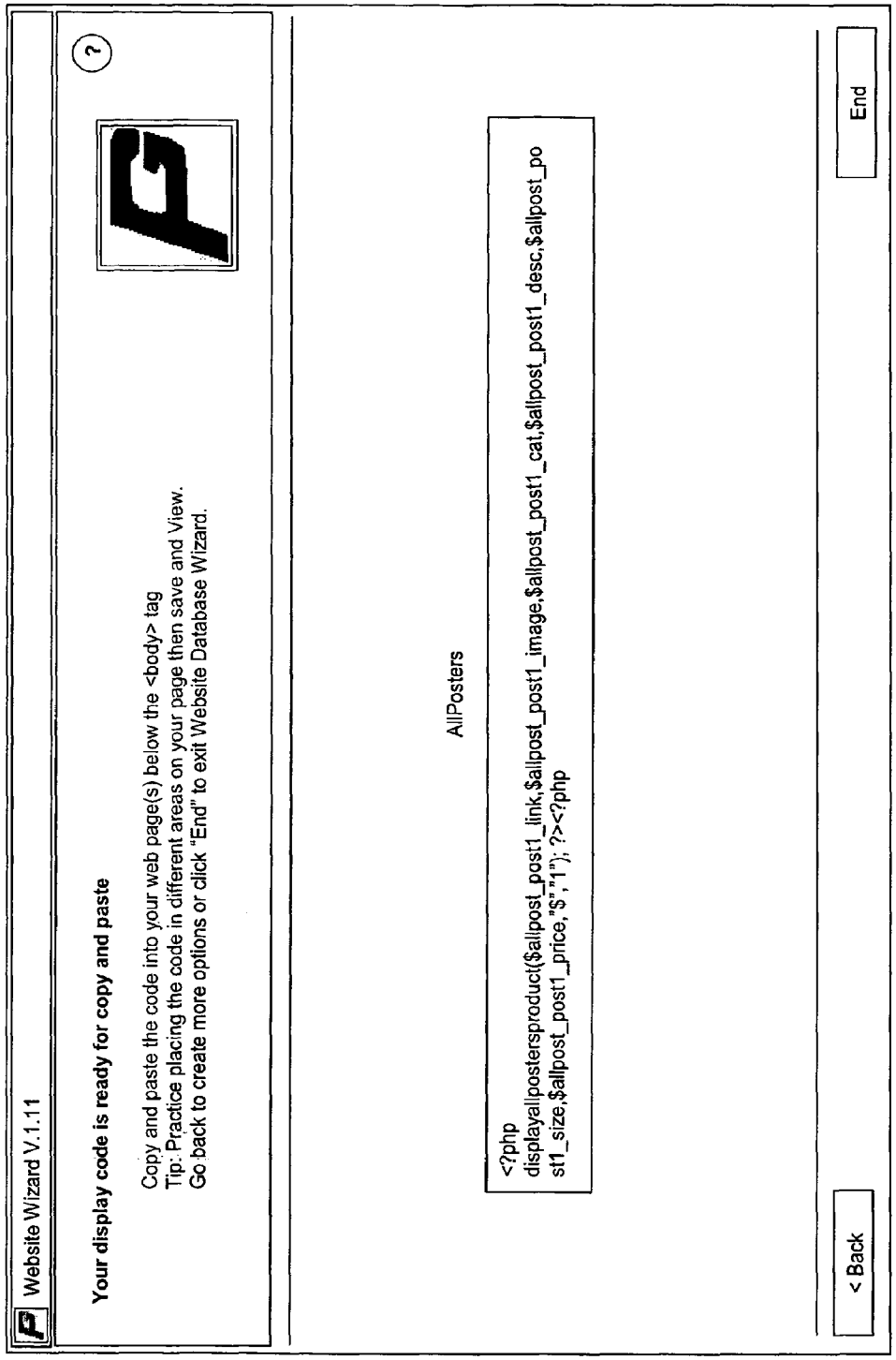

Then, the code is displayed as shown in FIG. 30 and is ready to be copied and pasted (Step 16T). The user must copy and paste the code into the Affiliate Website(s) below the <body> tag wherever the user requires products to appear. (Step 16L)

(3) Control Panel Wizard

In order to enable the user to take advantage of the various editing features of the Control Panel described above without the need to load the Products Generator computer program, the Products Generator program generates a "live" control panel that is built into the Affiliate Website and enables the registered affiliate to edit Product Windows in real time.

The Control Panel described above in connection with the Product Search Section of the Products Generator program and illustrated in FIGS. 10-14 operates while the Products Generator program is being executed on the client computer. However, the Products Generator program also creates a "live" Control Panel which enables the same Control Panel operations to be performed by a registered affiliate directly from the Affiliate Website. This is achieved by the insertion of software into the Affiliate Website to enable the above-described operations to be performed directly from the Affiliate.

The "live" Control Panel differs from the Products Generator program Control Panel in that the "live" Control Panel runs in a browser, i.e. Internet Explorer, Netscape Navigator, or the like, and is used to edit the live data that is currently being served along with the Affiliate Website, i.e., the Products Database which is being used for the Affiliate Website. Therefore, it follows that if the "live" Products Database is being edited, this will result in the changes being reflected live on the Affiliate Website.

FIGS. 31-35 illustrate the features of the Control Panel Setup Wizard which sets up the live Control Panel.

Figure 31:
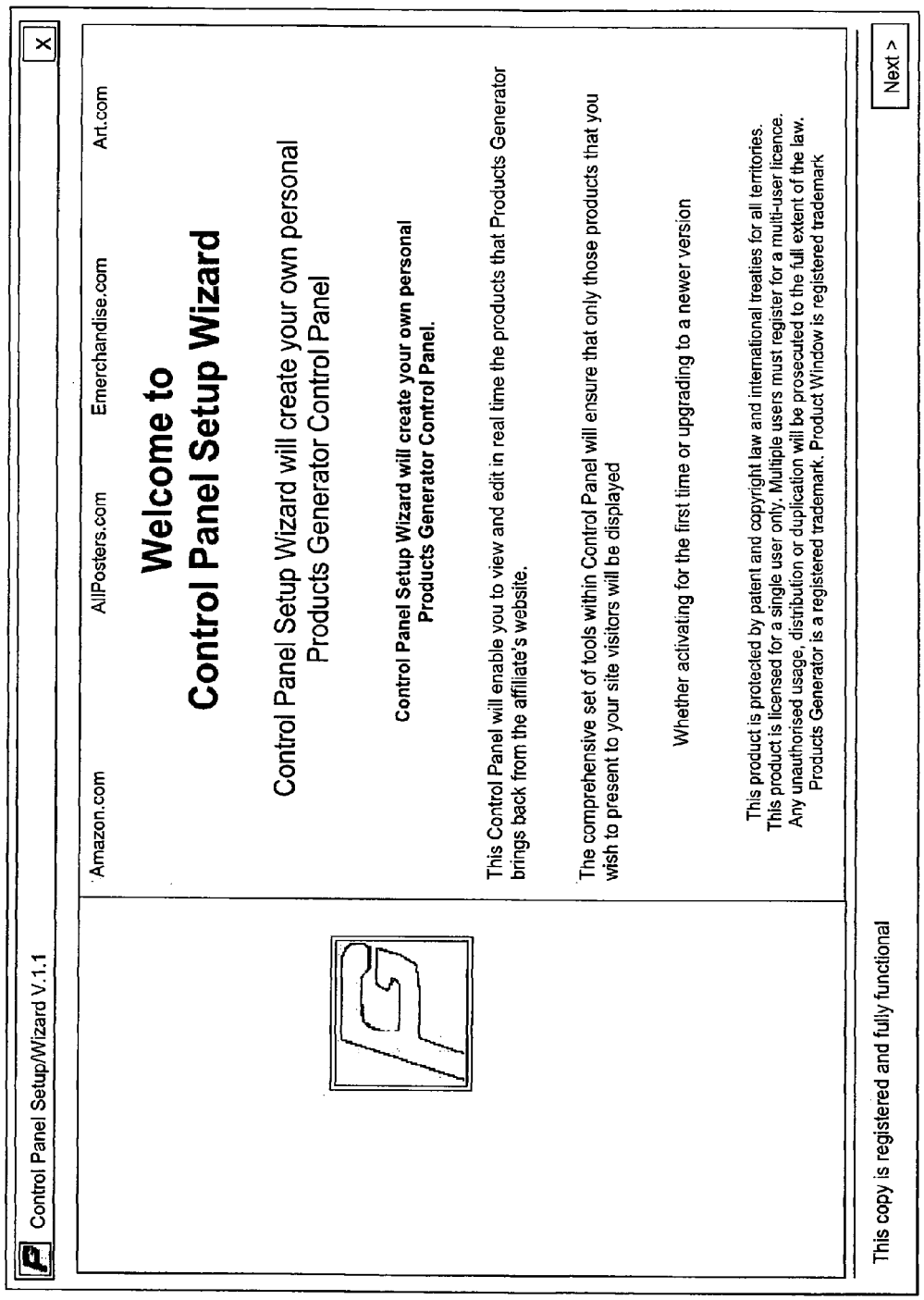
FIGS. 31-35 are images displayed on a computer monitor during execution of the Control Panel Wizard of the Products Generator computer program.

In response to selection of the Control Panel Wizard selection button 15 in FIG. 2, the welcome screen shown in FIG. 31 is displayed, which instructs the user that the Control Panel enables editing and viewing in real time, on the Affiliate Website, products that the Products Generator program brings back from Vendor Websites.

Figure 32:
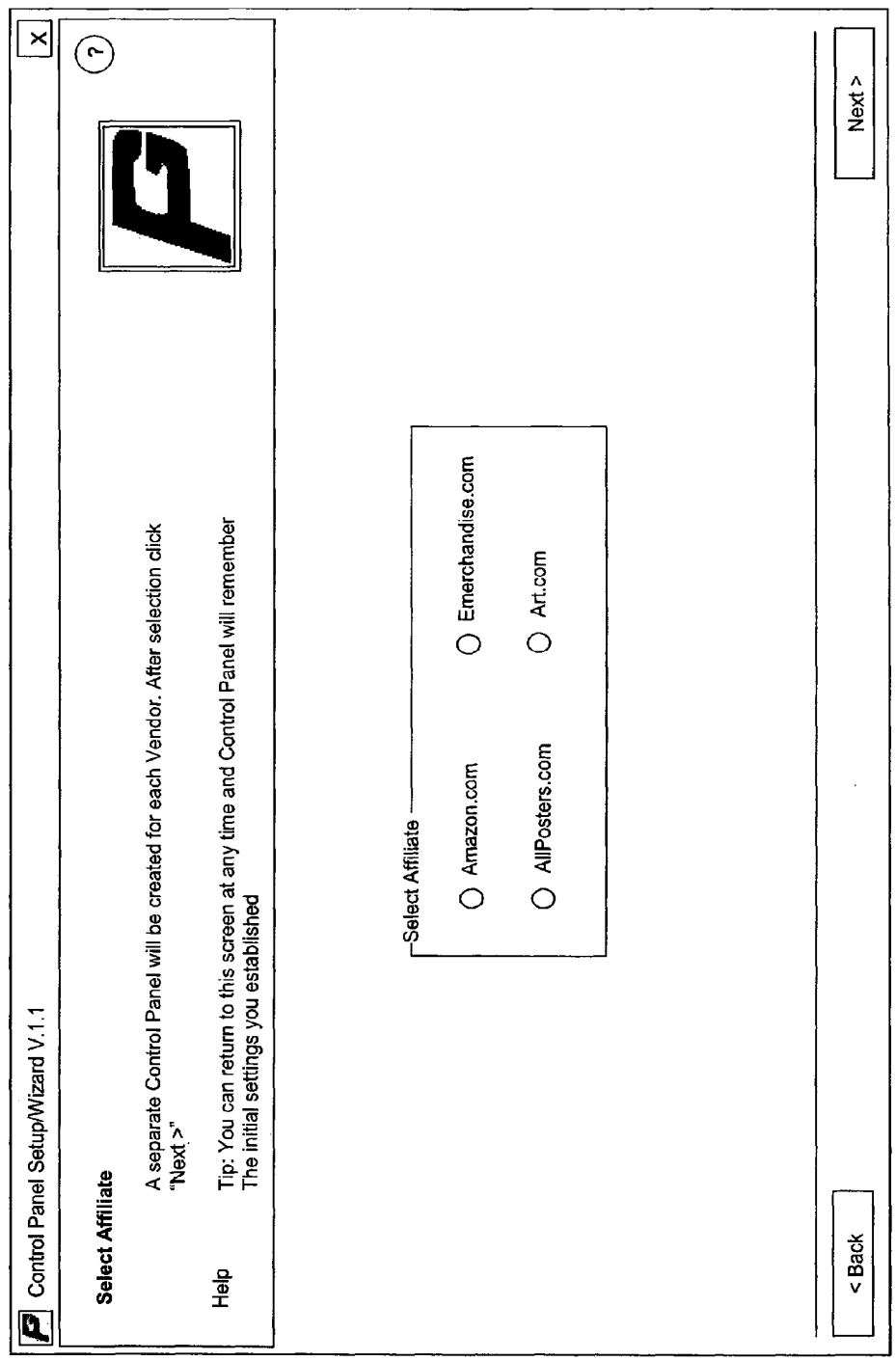
Figure 33:
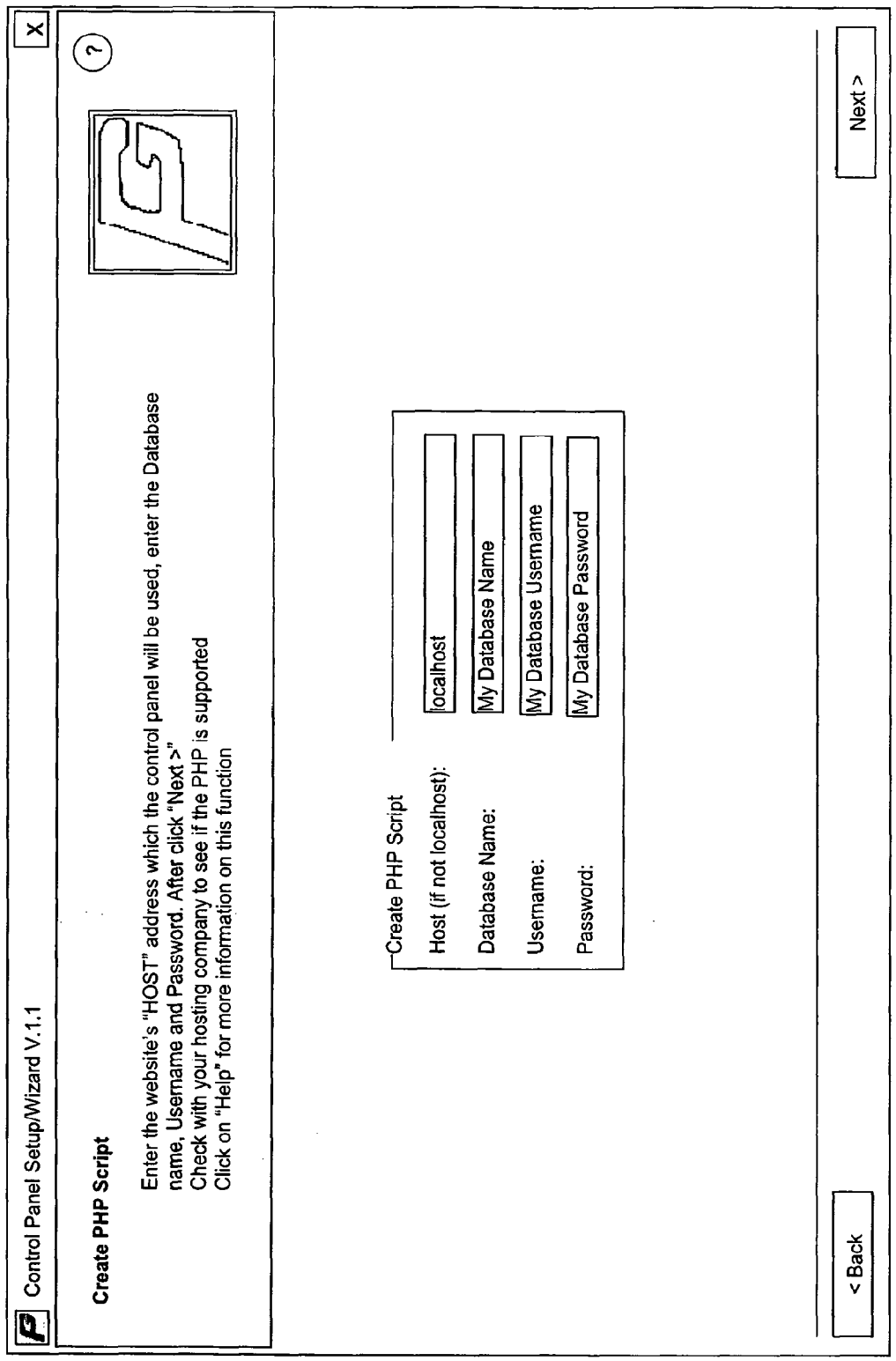

In FIG. 32, the user is prompted to select a Vendor Website from the participating Vendor Websites. A separate Control Panel is set up for each of the Vendor Websites to enable the registered affiliate to individually edit products from a respective Vendor Website directly from the Affiliate Website. When the user has clicked on the Next box in FIG. 32, the screen shown in FIG. 33 is displayed. This screen prompts the user to enter information needed to link to the uploaded Products Database, including Host, Database Name, Username and Password.

Figure 34:
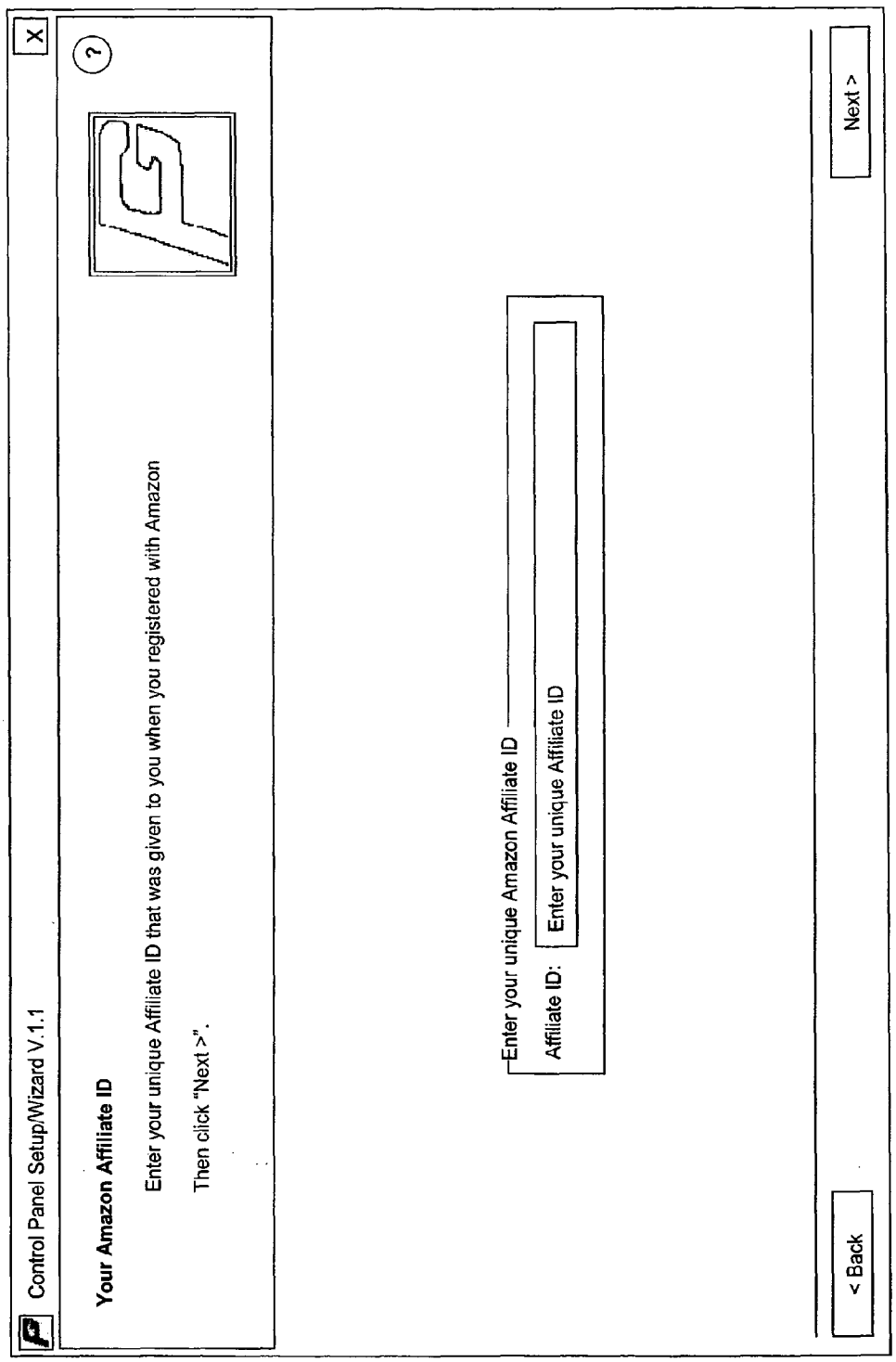
Figure 35:
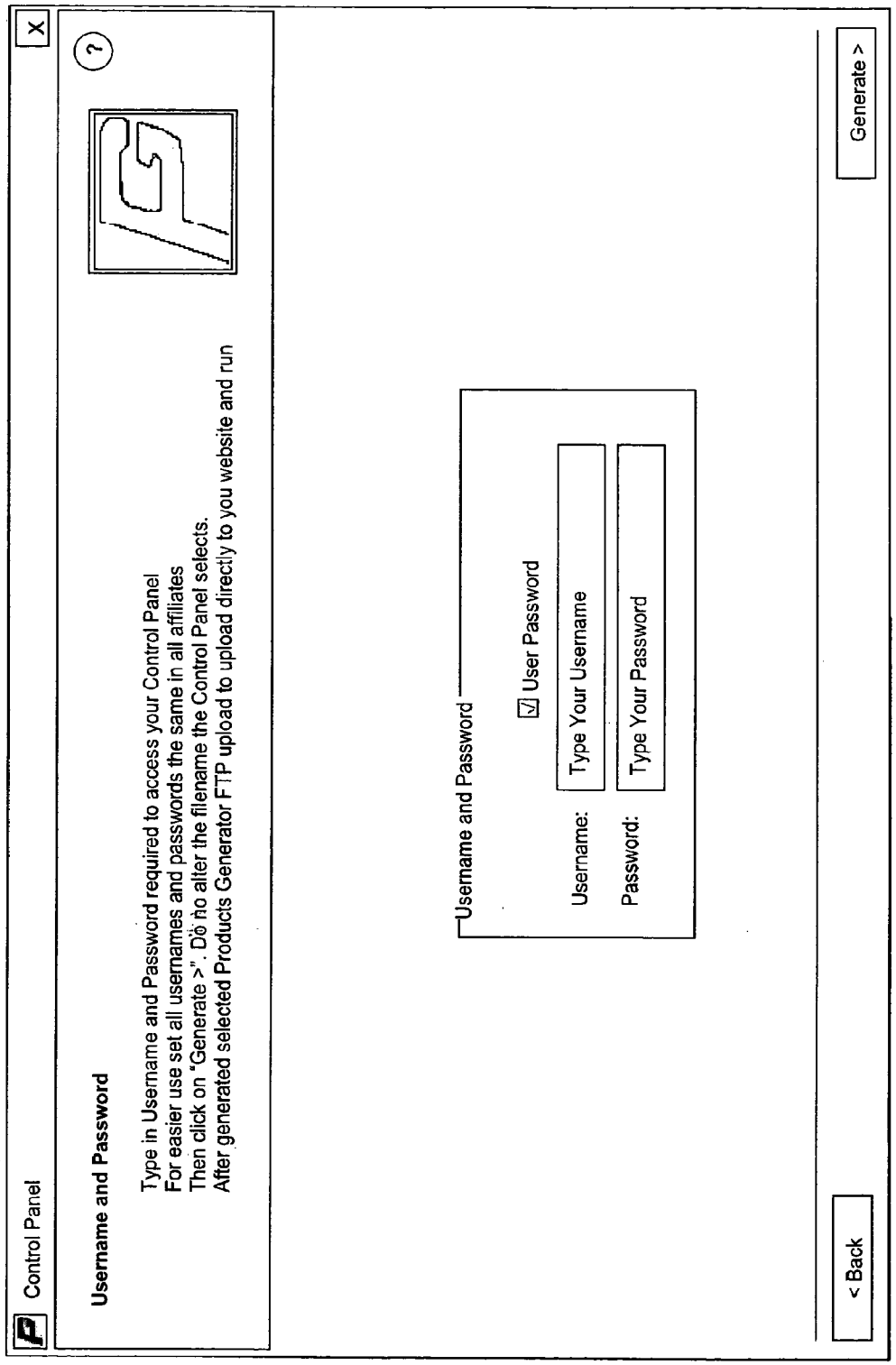

FIG. 34 prompts the user to enter the Affiliate ID or tracking number for the selected Vendor Website, and FIG. 35 permits the user to enter a User Name and Password in order to access the live Control Panel. When the foregoing information has been entered, Products Generator creates a file that is saved as a PHP script and uploaded to the server from which the Affiliate Website is served. This file allows the registered affiliate to perform any of the functions described above in connection with FIGS. 10-14 directly from the Affiliate Website rather than requiring the user to load the Products Generator program.

(4) "EMS", or E-Commerce Management System

The Products Generator software system is of a type referred to as an "EMS" system. EMS is an acronym for E-Commerce Management System. As opposed to the known Content Management System (CMS), EMS is a unique stand-alone system capable of generating e-commerce.

EMS comes into existence when integrated into a CMS system. For instance, the database used by the website www.famouslocations.com is an example of a CMS, and is a system of content storage for storing for display items such as locations, actors, directors, movies, and the like. The CMS provides keywords for the EMS product search.

The full integration of a EMS system into a CMS system involves the use of the EMS within the CMS system. For instance, from anywhere within the Famous Locations operations windows (such as the Movies Input Window), there is a link to the Products Generator program for the immediate search and retrieval of products. This means that if a user inputs a new, or old, movie title into the movies list of the www.famouslocations.com website, an immediate search of the participating vendor(s) for commission-earning products, via the Products Generator program, can be activated from a link on the www.famouslocations.com Window. The same technique applies to actors, directors, etc. Any relevant keyword in any CMS can be used for the instant activation of product searches using the EMS.

EMS Integrator, or E-Commerce Management System Integrator, is a software program or routine built into the Products Generator program that will add all the necessary coding, plus banner and drop-down vendor list containing the user's list of registered vendors to an existing or new CMS, or Content Management System, (e.g., the www.famouslocations.com database) to enable it to access or activate the EMS or E-Commerce Management System (Products Generator) from anywhere inside the CMS.

Using the www.famouslocations.com database as an example of a CMS, or Content Management System, this means that as a user inputs a new movie title, location, actor's or director's name, or the like, the same user can instantly generate products for that movie title, location, actor's or director's name, etc., by activating one or more links to Products Generator (the EMS, or E-commerce Management System) from the movie title, location, actor's or director's name location input page on www.famouslocations.com (the CMS).

Figure 36:
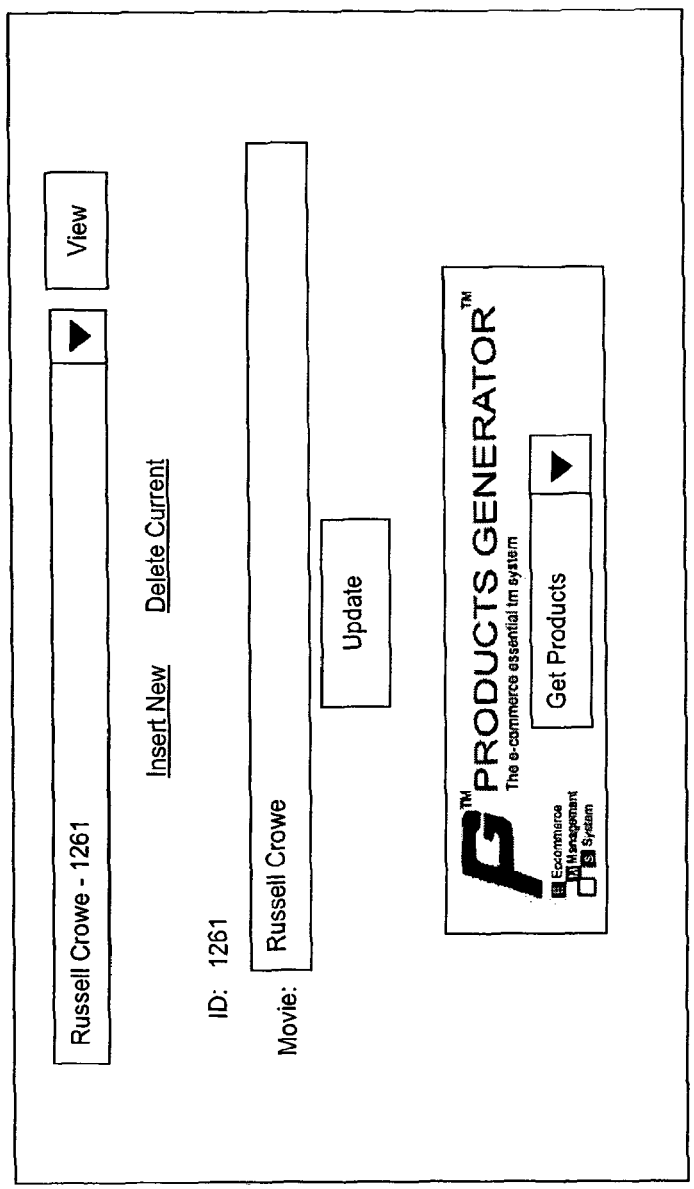

FIG. 36 illustrates the Famous Locations (CMS or Content Management System) "Actor" input page with a Products Generator (the EMS or E-commerce Management System) banner and link to the "Get Products" function of the Products Generator program. The drop-down "Get Products" box has a list of vendors, AMAZON.COM, ALLPOSTERS.COM, ART.COM and EMERCHANDISE.COM. When a desired vendor is selected from the drop-down list, the live Control Panel for that vendor is activated with the keyword, which in this case is Russell Crowe, a well-known actor, carried forward into the Control Panel. At the same time, the keyword, Russell Crowe, is carried forward into a Refresh Window which is activated with products retrieved from the vendor for that actor ready for selection and to be placed into the Control Panel. The result therefore is that in 2 clicks from data input into the CMS the EMS is activated with products available for selection.

FIG. 37 illustrates the Famous Locations (CMS or Content Management System) "Movie" input page with Products Generator (the EMS or E-commerce Management System) banner and link to "Get Products." The drop-down "Get Products" box has a list of vendors, including AMAZON.COM, ALLPOSTERS.COM, ART.COM and EMERCHANDISE.COM. When the desired vendor is selected from the drop-down list the Control Panel for that vendor is activated with the keyword, or name of movie, Titanic, as per this example carried forward into the Control Panel. At the same time, the keyword, movie, Titanic, is carried forward into a Refresh Window which is activated with products retrieved from the vendor for that movie, Titanic, ready for selection and to be placed into the Control Panel. The result therefore is that in 2 clicks from data input into the CMS the EMS is activated with products available for selection.

Although the Products Generator program has been described above in connection with a preferred embodiment which enables a user to search for and retrieve commission-earning products from a Vendor Website, the present invention is not limited to the foregoing description. For instance, the Products Generator program is also capable of retrieving and displaying any products, not limited to commission-earning products, from multiple Vendor Websites.

The Products Generator program can also be used, for example, by a vendor to retrieve and display its own products. Also, order fulfillment and credit card processing are additional features of the Products Generator program. A vendor has its own products and displays its own products via the Products Generator program. For instance, if a customer clicks on any of the displayed products on the Vendor Website, the customer is clicked through to an order fulfillment page and credit card processing page similar but not limited to Worldpay. Accordingly, the present invention includes these features as well.

For instance, the Products Generator program also offers a facility whereby a piece of code is generated by the program and inserted into the Affiliate Website via the Website Database Wizard, but not limited to the Website Database Wizard, whereby a product designated by a particular vendor can be inserted by the vendor into a "Special feature Products Database" on the Affiliate Website. The special product is then displayed as a "special" for a specific keyword on the Affiliate Website. For example, if the vendor obtains a brand-new stock of Titanic Collectors Box Set DVDs, the vendor has the ability to instantly promote it and establish it as a "special" for the keyword "Titanic" on all of its registered affiliate's Affiliate Websites.

By this method, the vendor has the facility to promote to all of the registered affiliates the vendor's latest special(s). If the Affiliate Website adopts the "special" product by manually inserting it into the affiliate's own main Products Database as soon as the special appears in the main products database, it is removed from the "special feature products database."

This method saves on product runs and assures both the vendor and its registered affiliates that the latest and greatest products for every keyword are being displayed.

With respect to the below claimed subject matter and specifically with request to any alterations presented in relation to any parent, child or related application set out above, Applicants make no disclaimers or disavowals of any subject matter in the present application and none should be inferred.

What is claimed is:

1. A method of creating an export file for use by a web developer to place product codes from one or more Vendor Websites, retrieved over a network, into an Affiliate Website, comprising:
   receiving a unique identification code from an operator associated with a Vendor Website;
   receiving a keyword list containing one or more keywords;
   establishing a connection to the Vendor Website over the network;
   searching the Vendor Website for products offered for sale relating to the one or more keywords;
   acquiring product codes, each including graphic data and descriptive text for products obtained in the search of the Vendor Website along with a link to the Vendor Website;
   inserting the unique identification code into the product codes;
   storing the product codes in a products database;
   displaying the product codes along with manually activatable editing buttons to allow a user to individually and globally select, de-select and update products to edit the products database; and
   creating the export file using the list of product codes stored in the edited products database.

2. The method of claim 1, wherein the acquiring product codes involves selecting a maximum number of products to be retrieved from the Vendor Website.

3. The method of claim 1, further comprising storing the unique identification code in the products database along with each individual product.

4. The method of claim 1, wherein the export file is a CSV file.

5. The method of claim 1, wherein the displaying of the product codes further includes displaying a drop-down list containing all of the keywords to enable the user to display all products corresponding to a selected one of the keywords.

6. The method of claim 1, further comprising selecting a number of product code menus to be displayed at one time, and wherein the displaying of the product codes at any point in time involves displaying as many product codes as the number of product code menus selected for display.

7. The method of claim 1, wherein the manually activatable editing buttons include a refresh button, the method further comprising detecting when the refresh button is selected for any one or more associated manually activatable editing buttons; performing a new search; and replacing a previously displayed product with a new product.

8. The method of claim 1, wherein the manually activatable editing buttons include a clear button, the method further comprising detecting when the clear button is selected for any one or more associated manually activatable buttons; identifying additional product codes retrieved during the searching of the Vendor Website not previously displayed; and replacing currently displayed products to be cleared with a new product to be displayed therefor.

9. The method of claim 1, wherein the manually activatable editing buttons include a padlock icon, the method further comprising detecting when the padlock button is selected for any of the manually activatable editing buttons, and locking the currently displayed products whose padlock icons are selected to prevent changes thereto.

10. The method of claim 1, wherein the displaying further comprises displaying a progress calculator indicating the value of products retrieved from the Vendor Website for each keyword and potential commission earnings for sales of such products made via the Affiliate Website.

11. The method of claim 1, wherein the Vendor Website is a promoter of a plurality of actual product vendors, each actual product vendor serving product codes to the Vendor Website to be searched.

12. A method of generating an export file having product codes retrieved from a plurality of vendor websites over a network to be inserted into an affiliate website of an affiliate, comprising:
   acquiring a unique identification code of the affiliate for each of the plurality of vendor websites;
   creating a single keyword list containing one or more keywords;
   storing the single keyword list;
   establishing over the network a connection to a selected one of the plurality of vendor websites;
   searching the selected vendor website for products offered for sale relating to the one or more keywords of the single keyword list;
   acquiring product codes including graphic data and descriptive text for products obtained in the search of the selected vendor website along with a link to the selected vendor website;
   inserting the affiliate's unique identification code into the acquired product codes;
   repeating the steps of establishing, searching, acquiring, and inserting for each remaining vendor website of the plurality of vendor websites;
   storing the product codes of the plurality of vendor websites in a products database;
   displaying the product codes of the plurality of vendor websites along with manually activatable editing buttons to allow a user to individually and globally select, de-select and update products to edit the products database;
   editing the products database based on user selections to create an edited products database; and
   creating the export file including the edited products database to be used in the creation or updating of the affiliate website.

13. The method of claim 12, wherein the displaying the product codes further includes displaying a drop-down list containing all of the keywords to enable the user to display all products corresponding to a selected one of the keywords.

14. The method of claim 12, wherein the manually activatable editing buttons include a refresh button, the method further comprising detecting when the refresh button is selected for any one or more associated manually activatable editing buttons; performing a new search; and replacing a previously displayed product with a new product.

15. The method of claim 12, wherein the manually activatable editing buttons include a clear button, the method further comprising detecting when the clear button is selected for any one or more associated manually activatable buttons; identifying additional product codes retrieved during the searching of the Vendor Website not previously displayed; and replacing currently displayed products to be cleared with a new product to be displayed therefor.

16. The method of claim 12, wherein the manually activatable editing buttons include a padlock icon, the method further comprising detecting when the padlock button is selected for any of the manually activatable editing buttons, and locking the currently displayed products whose padlock icons are selected to prevent changes thereto.

17. The method of claim 12, wherein the identified products are commission earning products, the method further comprising identifying a commission rate associated with the selected Vendor Website.

18. The method of claim 12, wherein the export file is a CSV file.

19. A method of generating an export file having product codes retrieved from a plurality of vendor websites over a network to be inserted into an affiliate website of an affiliate, comprising:
   storing, on a computer, search routines for the respective vendor websites, the search routines being operable to conduct searches for products associated with the respective vendor websites;
   storing, on the computer, a unique tracking identification code of the affiliate for each of the vendor websites;
   storing, on the computer, at least one keyword list containing one or more keywords;
   searching selected ones of the vendor websites for commission earning products offered for sale relating to the stored at least one keyword list in response to execution of the stored search routines for the selected vendor websites;
   acquiring product codes including graphic data and descriptive text and a vendor website link for identified products obtained by the searching step for each selected vendor website;
   inserting the affiliate's unique tracking identification code for each selected vendor website into the product codes of the identified products associated with each selected vendor website;
   generating a products database of the identified products having the product codes into which the affiliate's unique tracking identification code of each selected vendor website has been inserted;
   displaying the product codes associated with the identified products along with manually activatable editing buttons to allow a user to individually and globally select, de-select and update products to edit the products database;
   editing the products database based on user selections to create an edited products database; and
   creating the export file including the edited products database to be used in the creation or updating of the affiliate website.

20. The method of claim 19, further comprising selecting a number of product code menus to be displayed at one time, and wherein the displaying of the product codes at any point in time involves displaying as many product codes as the number of product code menus selected for display.

21. The method of claim 19, wherein the manually activatable editing buttons include a refresh button, the method further comprising detecting when the refresh button is selected for any one or more associated manually activatable editing buttons; performing a new search; and replacing a previously displayed product with a new product.

22. The method of claim 19, wherein the manually activatable editing buttons include a clear button, the method further comprising detecting when the clear button is selected for any one or more associated manually activatable buttons; identifying additional product codes retrieved during the searching of the Vendor Website not previously displayed; and replacing currently displayed products to be cleared with a new product to be displayed therefor.

23. The method of claim 19, wherein the manually activatable editing buttons include a padlock icon, the method further comprising detecting when the padlock button is selected for any of the manually activatable editing buttons, and locking the currently displayed products whose padlock icons are selected to prevent changes thereto.

24. The method of claim 19, wherein the identified products are commission earning products, the method further comprising identifying a commission rate associated with the selected Vendor Website.

25. The method of claim 19, wherein the export file is a CSV file.

26. A method of generating an export file having product codes retrieved from a plurality of vendor product databases over a network to be inserted into an affiliate website of an affiliate, comprising:
    acquiring a unique identification code of the affiliate for each of the plurality of vendor product databases;
    creating a single category list containing one or more product categories;
    storing the single category list;
    searching the selected vendor product database for products offered for sale relating to the one or more product categories of the single category list; acquiring product codes including graphic data and descriptive text for products obtained in the search of the selected vendor product database;
    inserting the affiliate's unique identification code into the acquired product codes;
    repeating the steps of searching, acquiring, and inserting for each remaining vendor product database of the plurality of vendor product databases;
    storing the product codes of the plurality of vendor product databases in a products database;
    displaying the product codes of the plurality of vendor products databases along with manually activatable editing buttons to allow a user to individually and globally select, de-select and update products to edit the products database;
    editing the products database based on user selections to create an edited products database; and
    creating the export file including the edited products database to be used in the creation or updating of the affiliate website.

27. The method of claim 26, further comprising displaying a progress calculator indicating the new value of products associated with the edited product database for each category list and potential commission earnings for sales of such products made via the affiliate website.

28. The method of claim 26, wherein displaying the product codes further includes displaying a drop-down list containing all of the keywords to enable the user to display all products corresponding to a selected one of the keywords.

29. The method of claim 26, wherein the manually activatable editing buttons include a refresh button, the method further comprising detecting when the refresh button is selected for any one or more associated manually activatable editing buttons; performing a new search; and replacing a previously displayed product with a new product.

30. The method of claim 26, wherein the manually activatable editing buttons include a clear button, the method further comprising detecting when the clear button is selected for any one or more associated manually activatable buttons; identifying additional product codes retrieved during the searching of the Vendor Website not previously displayed; and replacing currently displayed products to be cleared with a new product to be displayed therefor.

31. The method of claim 26, wherein the manually activatable editing buttons include a padlock icon, the method further comprising detecting when the padlock button is selected for any of the manually activatable editing buttons, and locking the currently displayed products whose padlock icons are selected to prevent changes thereto.

32. The method of claim 26, further comprising identifying a commission rate associated with at least one of (i) the acquired products and (ii) the total commission of acquired products associated with each vendor product database.

33. The method of claim 26, wherein the export file is a CSV file.

34. A method of generating an export file having product codes retrieved from a plurality of vendor product databases over a network to be inserted into an affiliate website of an affiliate, comprising:
    storing, on a computer, search routines for the respective vendor product databases, the search routines being operable to conduct searches for products associated with the respective vendor product databases;
    storing on the computer a unique tracking identification code of the affiliate for each of the vendor product databases;
    storing on the computer at least one category list containing one or more product categories;
    searching selected ones of the vendor product databases for commission earning products offered for sale relating to the stored at least one category list in response to execution of the stored search routines for the selected vendor product database;
    acquiring product codes including graphic data and descriptive text for identified products obtained by the searching step for each selected vendor product database;
    inserting the affiliate's unique tracking identification code for each selected vendor product database into the product codes of the identified products associated with each selected vendor product database;
    generating a products database of the identified products having the product codes into which the affiliate's unique tracking identification code of each selected vendor product database has been inserted;
    editing the products database based on user selections to create an edited products database; and
    creating the export file including the edited products database to be used in the creation or updating of the affiliate website.

35. The method of claim 34, further comprising indicating a value of the acquired products from the selected vendor product databases for each category list and potential commission earnings for sales of the acquired products to be made via the affiliate website.

36. The method of claim 34, wherein the export file is a CSV file.

37. A method of generating an export file including links to a plurality of commission earning items for insertion in an affiliate website, comprising:

displaying a control panel interface for receiving user selections;

receiving at the control panel interface at least one keyword to search a database of commission earning items available by at least one vendor;

identifying a corresponding search routine associated with the at least one vendor;

performing a search of the database of commission earning items using the keyword and the identified search routines to generate a plurality of commission earning items to be selected from;

displaying a viewable window of a first subset of the plurality of commission earning items generated along with control functionality to enable user selection and de-selection;

generating a further viewable window for each subsequent remaining subset of the plurality of commission earning items, until all of the plurality of commission earning items identified in the search have been viewed and selected or de-selected;

adding a corresponding tracking ID in the code of each commission earning item to identify to the at least one vendor the entity to be awarded a commission when a visitor to the affiliate website links to the vendor from a commission earning item associated with that vendor; and creating the export file of all selected ones of the plurality of commission earning items to facilitate future placement of multiple commission earning items, by a website developer, across at least one or more pages of the affiliate website.

38. The method of claim 37, wherein the receiving at least one keyword involves receiving multiple keywords, the method further comprising displaying a drop-down list containing all of the keywords to enable the user to display all commission earning items corresponding to a selected one of the keywords.

39. The method of claim 37, wherein the control functionality to enable user selection and de-selection includes manually activatable editing buttons to allow a user to individually and globally select, de-select and update displayed commission earning items.

40. The method of claim 39, further comprising automatically refreshing a viewable window when a commission earning item is de-selected to replace the de-selected items with commission earning item.

41. The method of claim 39, further comprising detecting when a clear button has been selected and in response thereto causing a displayed item to be replaced with a new commission earning item.

42. The method of claim 37, further comprising defining the size of the first subset to control the number of simultaneously viewable commission earning items to be displayed.

43. The method of claim 37, wherein the performing a search includes first identifying the number of commission earning items to be retrieved from each vendor.

44. The method of claim 37, wherein the displaying further includes displaying a commission rate associated with at least one displayed commission earning item.

45. The method of claim 37, wherein the export file is a CSV file.

46. A non-transitory computer-readable storage medium with an executable program stored thereon for creating by a computer an export file for use by a web developer to place product codes from one or more Vendor Websites, retrieved over a network, into an Affiliate Website, the executable program having instructions to:

receive a unique identification code associated with a Vendor Website;

receive a keyword list containing one or more keywords;

establish a connection to the Vendor Website over the network;

search the Vendor Website for products offered for sale relating to the one or more keywords;

acquire product codes, each including graphic data and descriptive text for products obtained in the search of the Vendor Website along with a link to an associated vendor to facilitate the purchase of a product or service when linking therefrom;

insert the unique identification code into the product codes;

store the product codes in a products database;

display the product codes along with manually activatable editing buttons which allow a user to individually and globally select, de-select and update products to edit the products database; and create the export file using the list of product codes stored in the edited products database.

47. A non-transitory computer-readable storage medium with an executable program stored thereon for creating by a computer an export file to be used to retrieve product codes from a plurality of vendor websites over a network for insertion into an affiliate website of an affiliate, the executable program having instructions that configure the computer to:

acquire a unique identification code of the affiliate for each of the plurality of vendor websites;

create a single keyword list containing one or more keywords;

store the single keyword list;

establish over the network a connection to a selected one of the plurality of vendor websites;

search the selected vendor website for products offered for sale relating to the one or more keywords of the single keyword list;

acquire product codes including graphic data and descriptive text for products obtained in the search of the selected vendor website along with a link to the selected vendor website;

insert the affiliate's unique identification code into the acquired product codes;

repeat the steps of establishing, searching, acquiring, and inserting for each remaining vendor website of the plurality of vendor websites;

store the product codes of the plurality of vendor websites in a products database;

display the product codes of the plurality of vendor websites along with manually activatable editing buttons to allow a user to individually and globally select, de-select and update products to edit the products database;

edit the products database based on user selections to create an edited products database; and create the export file including the edited products database to be used in the creation or updating of the affiliate website.

48. A non-transitory computer-readable storage medium with an executable program stored thereon for creating by a computer an export file to be used to retrieve product codes from a plurality of vendor websites over a network for insertion into an affiliate website of an affiliate, the executable program having instructions that configure the computer to:

store on a computer search routines for the respective vendor websites, the search routines being operable to conduct searches for products associated with the respective vendor websites;

store on the computer a unique tracking identification code of the affiliate for each of the vendor websites;

store on the computer at least one keyword list containing one or more keywords;

search selected ones of the vendor websites for commission earning products offered for sale relating to the stored at least one keyword list in response to execution of the stored search routines for the selected vendor websites;

acquire product codes including graphic data and descriptive text and a vendor website link for identified products obtained by the searching step for each selected vendor website;

insert the affiliate's unique tracking identification code for each selected vendor website into the product codes of the identified products associated with each selected vendor website;

generate a products database of the identified products having the product codes into which the affiliate's unique tracking identification code of each selected vendor website has been inserted;

display the identified products having the product codes along with manually activatable editing buttons to allow a user to individually and globally select, de-select and update products to edit the products database;

edit the products database based on user selections to create an edited products database; and create the export file including the edited products database to be used in the creation or updating of the affiliate website.

49. A non-transitory computer-readable storage medium with an executable program stored thereon for creating by a computer an export file to be used to retrieve product codes from a plurality of vendor product databases over a network for insertion into an affiliate website of an affiliate, the executable program having instructions that configure the computer to:

acquire a unique identification code of the affiliate for each of the plurality of vendor product databases;

create a single category list containing one or more product categories;

store the single category list; searching the selected vendor product database for products offered for sale relating to the one or more product categories of the single category list;

acquire product codes including graphic data and descriptive text for products obtained in the search of the selected vendor product database;

insert the affiliate's unique identification code into the acquired product codes;

repeat the searching, acquiring, and inserting for each remaining vendor product database of the plurality of vendor product databases;

store the product codes of the plurality of vendor product databases in a products database;

display the product codes of the plurality of vendor products databases along with manually activatable editing buttons allow a user to individually and globally select, de-select and update products to edit the products database;

edit the products database based on user selections to create an edited products database; and create the export file including the edited products database to be used in the creation or updating of the affiliate website.

50. A non-transitory computer-readable storage medium with an executable program stored thereon for creating by a computer an export file to be used to retrieve product codes from a plurality of vendor product databases over a network for insertion into an affiliate website of an affiliate, the executable program having instructions that configure the computer to:

store, on a computer, search routines for the respective vendor product databases, the search routines being operable to conduct searches for products associated with the respective vendor product databases;

store on the computer a unique tracking identification code of the affiliate for each of the vendor product databases;

store on the computer at least one category list containing one or more product categories;

search selected ones of the vendor product databases for commission earning products offered for sale relating to the stored at least one category list in response to execution of the stored search routines for the selected vendor product database;

acquire product codes including graphic data and descriptive text for identified products obtained by the searching step for each selected vendor product database;

insert the affiliate's unique tracking identification code for each selected vendor product database into the product codes of the identified products associated with each selected vendor product database;

generate a products database of the identified products having the product codes into which the affiliate's unique tracking identification code of each selected vendor product database has been inserted;

edit the products database based on user selections to create an edited products database; and create the export file including the edited products database to be used in the creation or updating of the affiliate website.

51. A non-transitory computer-readable storage medium with an executable program stored thereon for creating by a computer an export file to be used to retrieve product codes from a plurality of vendor product databases over a network for insertion into an affiliate website of an affiliate, the executable program having instructions that configure the computer to:

display a control panel interface for receiving user selections;

receive at the control panel interface at least one keyword to search a database of commission earning items available by at least one vendor;

identify a corresponding search routine associated with the at least one vendor;

perform a search of the database of commission earning items using the keyword and the identified search routines to generate a plurality of commission earning items to be selected from;

display a viewable window of a first subset of the plurality of commission earning items generated along with control functionality to enable user selection and de-selection;

generate a further viewable window for each subsequent remaining subset of the plurality of commission earning items, until all of the plurality of commission earning items identified in the search have been viewed and selected or de-selected;

add a corresponding tracking ID in the code of each commission earning item to identify to the at least one vendor the entity to be awarded a commission when a visitor to the affiliate website links to the vendor from a commission earning item associated with that vendor; and create the export file of all selected ones of the plurality of commission earning items to facilitate future placement of multiple commission earning items, by a website developer, across at least one or more pages of the affiliate website.

52. An apparatus for creating an export file for use by a web developer to place product codes from one or more Vendor Websites, retrieved over a network, into an Affiliate Website, comprising:
   means for receiving a unique identification code associated with a Vendor Website;
   means for receiving a keyword list containing one or more keywords;
   means for establishing a connection to the Vendor Website over the network;
   means for searching the Vendor Website for products offered for sale relating to the one or more keywords;
   means for acquiring product codes, each including graphic data and descriptive text for products obtained in the search of the Vendor Website along with a link to an associated vendor to facilitate the purchase of a product or service when linking therefrom;
   means for inserting the unique identification code into the product codes;
   means for storing the product codes in a products database;
   means for displaying the product codes along with manually activatable editing buttons to allow a user to individually and globally select, de-select and update products to edit the products database; and
   means for creating the export file using the list of product codes stored in the edited products database.

53. An apparatus for creating an export file to be used to retrieve product codes from a plurality of vendor websites over a network for insertion into an affiliate website of an affiliate, comprising:
   means for acquiring a unique identification code of the affiliate for each of the plurality of vendor websites;
   means for creating a single keyword list containing one or more keywords;
   means for storing the single keyword list;
   means for establishing over the network a connection to a selected one of the plurality of vendor websites;
   means for searching the selected vendor website for products offered for sale relating to the one or more keywords of the single keyword list;
   means for acquiring product codes including graphic data and descriptive text for products obtained in the search of the selected vendor website along with a link to the selected vendor website;
   means for inserting the affiliate's unique identification code into the acquired product codes;
   means for repeating the establishing, searching, acquiring, and inserting for each remaining vendor website of the plurality of vendor websites;
   means for storing the product codes of the plurality of vendor websites in a products database;
   means for displaying the product codes of the plurality of vendor websites along with manually activatable editing buttons to allow a user to individually and globally select, de-select and update products to edit the products database;
   means for editing the products database based on user selections to create an edited products database; and
   means for creating the export file including the edited products database to be used in the creation or updating of the affiliate website.

54. An apparatus for creating an export file to be used to retrieve product codes from a plurality of vendor websites over a network for insertion into an affiliate website of an affiliate, comprising:
   means for storing on a computer search routines for the respective vendor websites, the search routines being operable to conduct searches for products associated with the respective vendor websites;
   means for storing on the computer a unique tracking identification code of the affiliate for each of the vendor websites;
   means for storing on the computer at least one keyword list containing one or more keywords;
   means for searching selected ones of the vendor websites for commission earning products offered for sale relating to the stored at least one keyword list in response to execution of the stored search routines for the selected vendor websites;
   means for acquiring product codes including graphic data and descriptive text and a vendor website link for identified products obtained by the searching step for each selected vendor website;
   means for inserting the affiliate's unique tracking identification code for each selected vendor website into the product codes of the identified products associated with each selected vendor website;
   means for generating a products database of the identified products having the product codes into which the affiliate's unique tracking identification code of each selected vendor website has been inserted;
   means for displaying the identified products having the product codes along with manually activatable editing buttons to allow a user to individually and globally select, de-select and update products to edit the products database;
   means for editing the products database based on user selections to create an edited products database; and
   means for creating the export file including the edited products database to be used in the creation or updating of the affiliate website.

55. An apparatus for creating an export file to be used to retrieve product codes from a plurality of vendor product databases over a network for insertion into an affiliate website of an affiliate, comprising:
   means for acquiring a unique identification code of the affiliate for each of the plurality of vendor product databases;
   means for creating a single category list containing one or more product categories;
   means for storing the single category list; searching the selected vendor product database for products offered for sale relating to the one or more product categories of the single category list; acquiring product codes including graphic data and descriptive text for products obtained in the search of the selected vendor product database;
   means for inserting the affiliate's unique identification code into the acquired product codes;
   means for repeating the searching, acquiring, and inserting for each remaining vendor product database of the plurality of vendor product databases;
   means for storing the product codes of the plurality of vendor product databases in a products database;
   means for displaying the product codes of the plurality of vendor products databases along with manually activatable editing buttons to allow a user to individually and globally select, de-select and update products to edit the products database;

means for editing the products database based on user selections to create an edited products database; and means for creating the export file including the edited products database to be used in the creation or updating of the affiliate website.

56. An apparatus for creating an export file to be used to retrieve product codes from a plurality of vendor product databases over a network for insertion into an affiliate website of an affiliate, comprising:

means for storing, on a computer, search routines for the respective vendor product databases, the search routines being operable to conduct searches for products associated with the respective vendor product databases;

means for storing on the computer a unique tracking identification code of the affiliate for each of the vendor product databases;

means for storing on the computer at least one category list containing one or more product categories;

means for searching selected ones of the vendor product databases for commission earning products offered for sale relating to the stored at least one category list in response to execution of the stored search routines for the selected vendor product database;

means for acquiring product codes including graphic data and descriptive text for identified products obtained by the searching step for each selected vendor product database;

means for inserting the affiliate's unique tracking identification code for each selected vendor product database into the product codes of the identified products associated with each selected vendor product database;

means for generating a products database of the identified products having the product codes into which the affiliate's unique tracking identification code of each selected vendor product database has been inserted;

means for editing the products database based on user selections to create an edited products database; and means for creating the export file including the edited products database to be used in the creation or updating of the affiliate website.

57. An apparatus for creating an export file to be used to retrieve product codes from a plurality of vendors over a network for insertion into an affiliate website of an affiliate, comprising:

means for displaying a control panel interface for receiving user selections;

means for receiving at the control panel interface at least one keyword to search a database of commission earning items available by at least one vendor;

means for identifying a corresponding search routine associated with the at least one vendor;

means for performing a search of the database of commission earning items using the keyword and the identified search routines to generate a plurality of commission earning items to be selected from;

means for displaying a viewable window of a first subset of the plurality of commission earning items generated along with control functionality to enable user selection and de-selection;

means for generating a further viewable window for each subsequent remaining subset of the plurality of commission earning items, until all of the plurality of commission earning items identified in the search have been viewed and selected or de-selected;

means for adding a corresponding tracking ID in the code of each commission earning item to identify to the at least one vendor the entity to be awarded a commission when a visitor to the affiliate website links to the vendor from a commission earning item associated with that vendor; and means for creating the export file of all selected ones of the plurality of commission earning items to facilitate future placement of multiple commission earning items, by a website developer, across at least one or more pages of the affiliate website.

* * * * *